(12) United States Patent
Park et al.

(10) Patent No.: US 12,300,876 B2
(45) Date of Patent: May 13, 2025

(54) ANTENNA AND ELECTRONIC DEVICE COMPRISING SAME

(71) Applicant: SAMSUNG ELECTRONICS CO., LTD., Suwon-si (KR)

(72) Inventors: Sungchul Park, Suwon-si (KR); Wonjoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 17/880,063

(22) Filed: Aug. 3, 2022

(65) Prior Publication Data

US 2022/0376380 A1 Nov. 24, 2022

Related U.S. Application Data

(63) Continuation of application No. PCT/KR2021/000749, filed on Jan. 19, 2021.

(30) Foreign Application Priority Data

Feb. 11, 2020 (KR) .................. 10-2020-0016163

(51) Int. Cl.
*H01Q 3/26* (2006.01)
*H01Q 1/24* (2006.01)

(52) U.S. Cl.
CPC .............. *H01Q 1/243* (2013.01); *H01Q 3/26* (2013.01)

(58) Field of Classification Search
CPC ........... H01Q 1/243; H01Q 3/26; H01Q 1/42; H01Q 21/28; H01Q 1/38; H04B 1/40; H04M 1/02; H04M 1/0249; H04M 1/0277

See application file for complete search history.

(56) References Cited

U.S. PATENT DOCUMENTS

| 8,896,487 B2 | 11/2014 | Chiang et al. |
| 9,876,272 B2 | 1/2018 | Hu et al. |

(Continued)

FOREIGN PATENT DOCUMENTS

| JP | 2016-86260 A | 5/2016 |
| JP | 2018-148290 A | 9/2018 |

(Continued)

OTHER PUBLICATIONS

Communication dated Apr. 29, 2021, issued by the International Searching Authority in counterpart International Application No. PCT/KR2021/000749 (PCT/ISA/210).

(Continued)

*Primary Examiner* — Julio R Perez
(74) *Attorney, Agent, or Firm* — Sughrue Mion, PLLC

(57) ABSTRACT

According to various embodiments, an electronic device includes a front cover; a rear cover facing away from the front cover; a side frame surrounding a space between the front cover and the rear cover and at least partially includes a first conductive portion; a first array antenna includes a first substrate disposed in the space and a plurality of first antenna elements disposed on the first substrate and configured to form a beam pattern toward the first conductive portion; and a wireless communication circuit configured to transmit and/or receive, via the first array antenna, a wireless signal in a first frequency range. The first conductive portion includes, in a portion corresponding to the first array antenna, a plurality of first slits provided to be spaced apart from each other and to have a length in a first direction perpendicular to a polarization of the first array antenna.

17 Claims, 32 Drawing Sheets

(56) References Cited

U.S. PATENT DOCUMENTS

| | | |
|---|---|---|
| 2009/0153412 A1 | 6/2009 | Chiang et al. |
| 2012/0268343 A1 | 10/2012 | Yanagi et al. |
| 2017/0201011 A1 | 7/2017 | Khripkov et al. |
| 2017/0294705 A1* | 10/2017 | Khripkov ............... H01Q 1/38 |
| 2018/0026341 A1 | 1/2018 | Mow et al. |
| 2018/0254555 A1 | 9/2018 | Sotoma et al. |
| 2018/0358686 A1 | 12/2018 | Park |
| 2019/0319341 A1 | 10/2019 | Park et al. |
| 2020/0014119 A1 | 1/2020 | Kim et al. |
| 2020/0021015 A1 | 1/2020 | Yun et al. |
| 2024/0283153 A1* | 8/2024 | Wang .................. H01Q 5/335 |
| 2024/0291159 A1* | 8/2024 | Yu ........................ H01Q 1/243 |
| 2024/0297437 A1* | 9/2024 | Park ...................... H01Q 5/357 |

FOREIGN PATENT DOCUMENTS

| | | |
|---|---|---|
| KR | 10-2017-0083949 A | 7/2017 |
| KR | 10-2017-0116558 A | 10/2017 |
| KR | 10-2018-0134528 A | 12/2018 |
| KR | 10-2019-0119954 A | 10/2019 |
| KR | 10-2020-0005364 A | 1/2020 |
| KR | 10-2020-0007377 A | 1/2020 |

OTHER PUBLICATIONS

Communication dated Apr. 29, 2021, issued by the International Searching Authority in counterpart International Application No. PCT/KR2021/000749 (PCT/ISA/237).

Communication dated Mar. 20, 2024, issued by the Korean Intellectual Property Office in Korean Patent Application No. 10-2020-0016163.

* cited by examiner

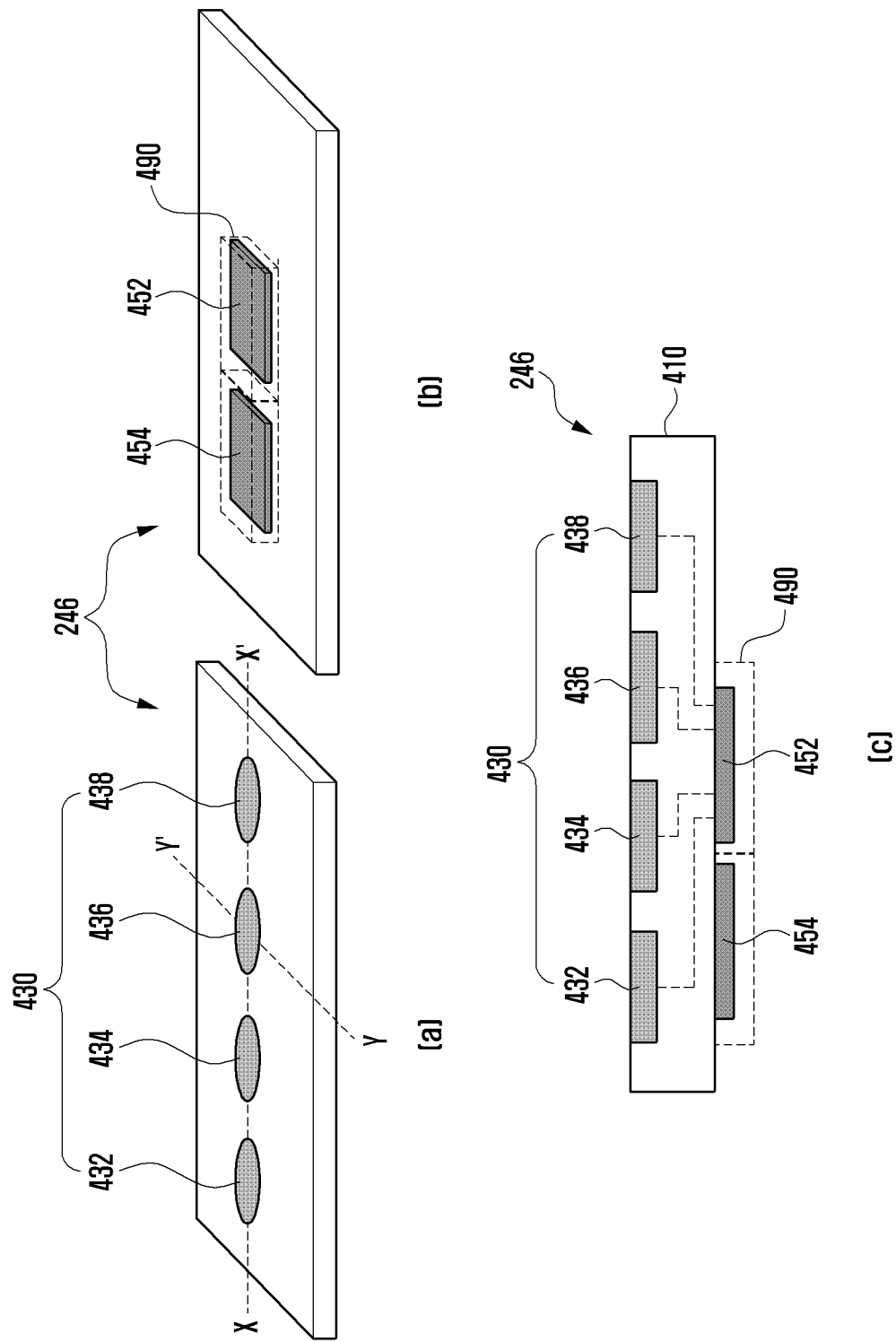

ANTENNA AND ELECTRONIC DEVICE COMPRISING SAME

CROSS-REFERENCE TO RELATED APPLICATIONS

This application is a continuation application of International Application No. PCT/KR2021/000749, filed on Jan. 19, 2021, which claims priority to Korean Patent Application No. 10-2020-0016163, filed on Feb. 11, 2020, in the Korean Intellectual Property Office, the disclosures of which are incorporated by reference herein in their entireties.

BACKGROUND

1. Field

The present disclosure relates to an antenna and an electronic device including the same.

2. Description of Related Art

With the development of wireless communication technology, electronic devices (e.g., electronic devices for communication) are commonly used in daily life, and thus use of contents is increasing exponentially. Due to the rapid increase of use of contents, network capacity is gradually reaching the limit thereof. After the commercialization of 4G (4th generation) communication systems, in order to meet the increasing demand for wireless data traffic, communication systems (e.g., a 5G (5th generation) communication system, a pre-5G communication system, or a new radio (NR)) that transmit and/or receive signals using a frequency of a high-frequency (e.g., the mmWave) band (e.g., a band in the range of 3 GHz to 300 GHz)) are being researched.

The next-generation wireless communication technology is capable of transmitting/receiving wireless signals by using a frequency substantially in the range of about 3 GHz to 100 GHz. An efficient mounting structure and a new antenna structure corresponding thereto are being developed in order to overcome high free-space loss due to frequency characteristics and to increase the gain of an antenna. For example, an antenna structure may include an array antenna in which one or more antenna elements (e.g., one or more conductive patterns and/or one or more conductive patches) are disposed at regular intervals on a printed circuit board. The antenna elements used as the array antenna may have equal or unequal phases inside an electronic device, and may be disposed to form a beam pattern in at least one direction. In addition, the electronic device may include a conductive structure (e.g., a conductive side frame provided as at least a portion of a housing, a conductive side member, or a display) that is at least partially disposed around the antenna structure to reinforce rigidity and provide a pleasing appearance.

However, when such a conductive structure is located in a direction in which a beam pattern formed by the one or more antenna elements of the antenna structure is oriented, the radiation direction of the antenna structure may be changed and/or distorted by the conductive structure in a direction different from a desired direction, which may result in deterioration of radiation performance of the antenna.

SUMMARY

According to an aspect of the present disclosure, an electronic device is provided. The electronic device includes a front cover, a rear cover facing away from the front cover, a side frame, a first array antenna, and a wireless communication circuit. The side frame surrounds a space between the front cover and the rear cover and at least partially includes a first conductive portion. The first array antenna includes a first substrate disposed in the space and a plurality of first antenna elements disposed on the first substrate. The plurality of first antenna elements are configured to form a beam pattern toward the first conductive portion. The wireless communication circuit is configured to perform, via the first array antenna, at least one of a transmission and a reception of a wireless signal in a first frequency range. The first conductive portion includes, in a portion corresponding to the first array antenna, a plurality of first slits provided to be spaced apart from each other and to have a length in a first direction perpendicular to a polarization of the first array antenna.

In some embodiments, the plurality of first antenna elements are configured to have equal or unequal phases and to form a beam.

In some embodiments, the first frequency range includes a frequency range of 20 GHz to 100 GHz.

In some embodiments, each of the plurality of first slits has a length of 2.5 to 4 mm.

In some embodiments, each of the plurality of first slits has a width of 0.6 to 0.8 mm.

In some embodiments, the electronic device further includes a second conductive portion disposed on at least one of the front cover and the rear cover near the first conductive portion.

In some embodiments, the first conductive portion and the second conductive portion are connected via a non-conductive portion.

In some embodiments, the electronic device further includes a second array antenna that includes a second substrate disposed on a portion corresponding to the second conductive portion in the space and a plurality of second antenna elements disposed on the second substrate. The second conductive portion includes, in a portion corresponding to the second array antenna, a plurality of second slits provided to be spaced apart from each other and have a length in a second direction perpendicular to a polarization of the second array antenna.

In some embodiments, the first array antenna is disposed to form first beam patterns, the second array antenna is disposed to form second beam patterns, and the first beam patterns are perpendicular to the second beam patterns.

In some embodiments, the first substrate is electrically connected to the second substrate via an electrical connection member.

In some embodiments, the second substrate includes the wireless communication circuit.

In some embodiments, the wireless communication circuit is configured to perform the at least one of the transmission and the reception of the wireless signal in the first frequency range via at least one of the first array antenna and the second array antenna.

In some embodiments, the electronic device further includes an acoustic sound device disposed in an inner space of the electronic device. In such embodiments, the plurality of first slits are configured as sound transmission passages of the acoustic sound device.

In some embodiments, the plurality of first slits are at least partially filled with a dielectric material.

In some embodiments, the dielectric material has a dielectric constant in a range of 4 to 10.

According to an aspect of the present disclosure, an electronic device is provided. The electronic device includes a front cover, a rear cover facing a direction opposite to the front cover, a side frame, a second conductive portion, a first array antenna, a second array antenna, and a wireless communication circuit. The side frame surrounds a space between the front cover and the rear cover and at least partially includes a first conductive portion. The second conductive portion is disposed on at least one of the front cover and the rear cover near the first conductive portion. The first array antenna includes a first substrate disposed in the space and a plurality of first antenna elements disposed on the first substrate. The plurality of first antenna elements is configured to form a beam pattern toward the first conductive portion. The second array antenna includes a second substrate disposed on a portion corresponding to the second conductive portion in the space and a plurality of second antenna elements disposed on the second substrate. The wireless communication circuit is configured to perform, via the first array antenna or the second array antenna, at least one of a transmission and a reception of a wireless signal in a first frequency range. The first conductive portion includes, in a portion corresponding to the first array antenna, a plurality of first slits provided to be spaced apart from each other and to have a length in a first direction perpendicular to a polarization of the first array antenna. The second conductive portion includes, in a portion corresponding to the second array antenna, a plurality of second slits provided to be spaced apart from each other and have a length in a second direction perpendicular to a polarization of the second array antenna.

In some embodiments, the first conductive portion and the second conductive portion are connected via a non-conductive portion.

In some embodiments, the first array antenna is disposed to form first beam patterns, the second array antenna is disposed to form second beam patterns, and the first beam patterns are perpendicular to the second beam patterns.

In some embodiments, the electronic device further includes an acoustic sound device disposed in an inner space of the electronic device. In such embodiments, the plurality of first slits are configured as sound transmission passages of the acoustic sound device.

In some embodiments, the plurality of first slits are at least partially filled with a dielectric material having a dielectric constant in a range of 4 to 10.

Various embodiments of the disclosure are capable of providing an antenna and an electronic device including the same.

Various embodiments of the disclosure are capable of providing an antenna implemented to suppress radiation performance degradation even when a conductive structure is disposed around the antenna, and an electronic device including the antenna.

An electronic device, according to various embodiments of the disclosure, includes a conductive structure having a plurality of slits through which a beam pattern of an antenna structure is capable of being radiated. Thus, the rigidity of the electronic device may be reinforced via the slits, and the antenna structure may be induced to form a beam pattern having a high gain in a predetermined direction.

BRIEF DESCRIPTION OF THE DRAWINGS

In connection with the description of the drawings, the same or similar components may be denoted by the same or similar reference numerals.

FIG. 4A illustrates an embodiment of the structure of a third antenna module described with reference to FIG. 2, according to various embodiments of the disclosure.

DETAILED DESCRIPTION

Figure 1:
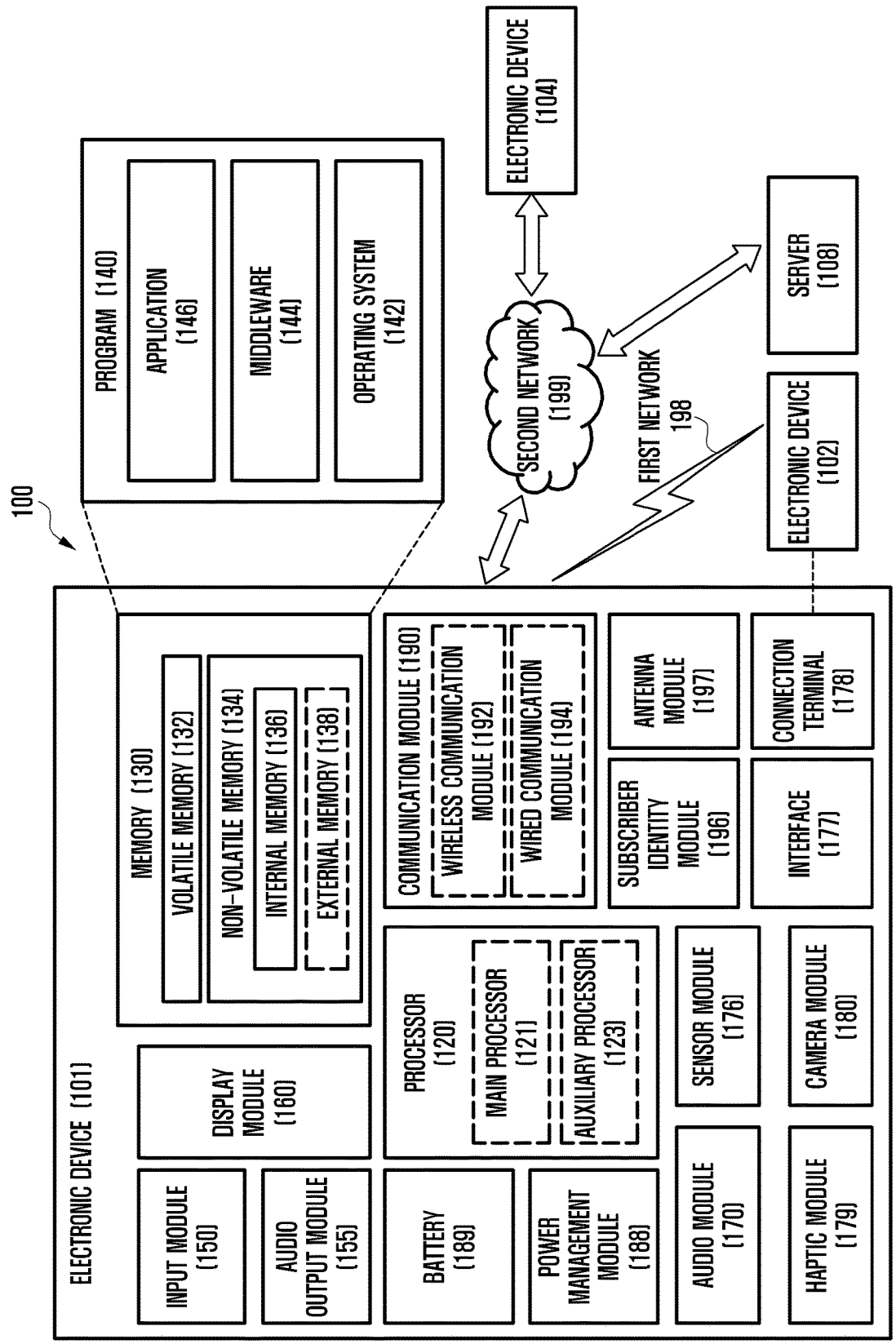
FIG. 1 is a block diagram of an electronic device, according to various embodiments of the disclosure in a network environment.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
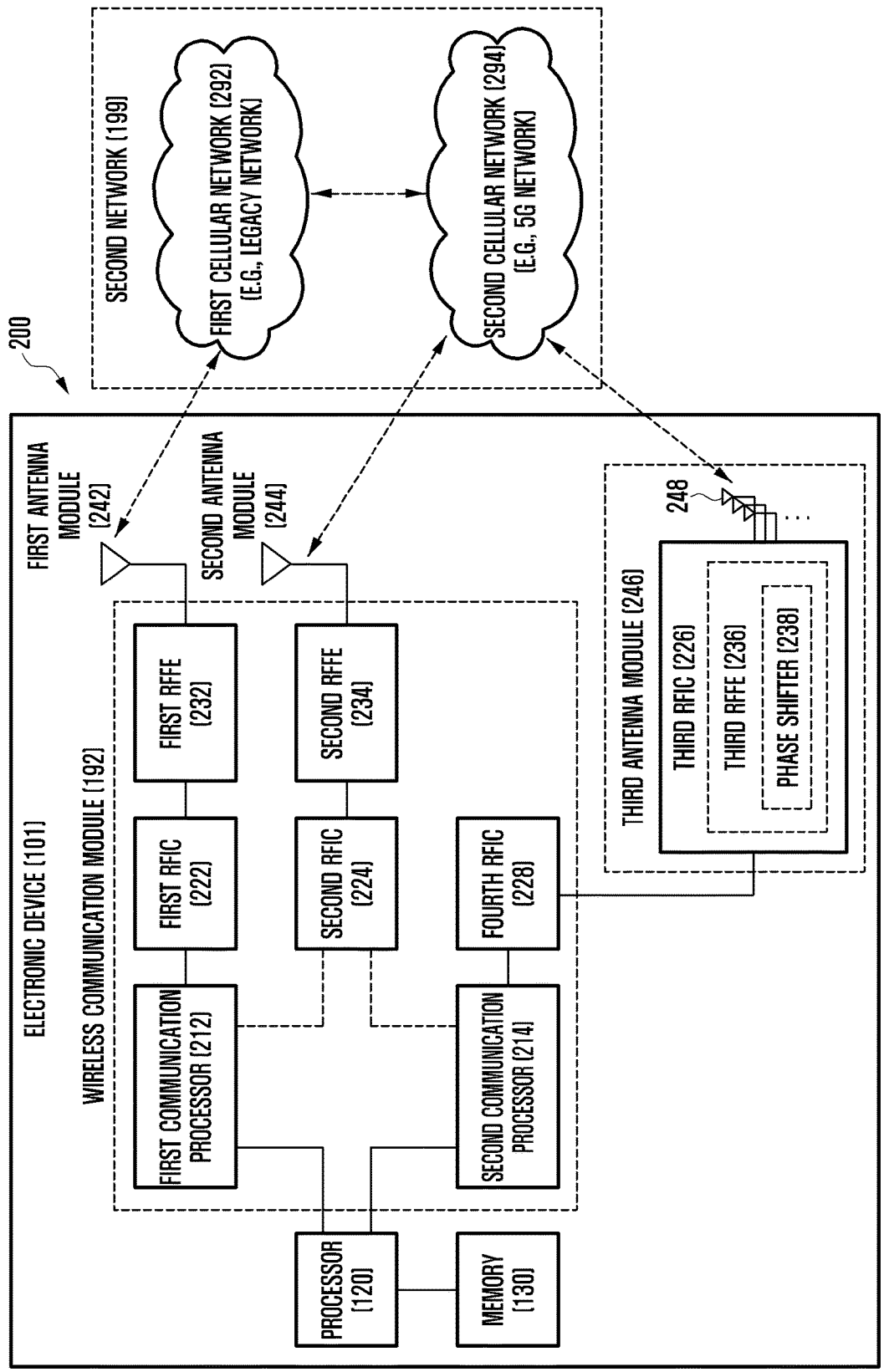
FIG. 2 is a block diagram of an electronic device for supporting legacy network communication and 5G network communication, according to various embodiments of the disclosure.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above6 RF signal. Upon reception, the 5G Above6 RF signal may be received from the second cellular network 294 (e.g., a 5G network) through an antenna (e.g., the antenna 248) and be converted to an IF signal by the third RFIC 226.

The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
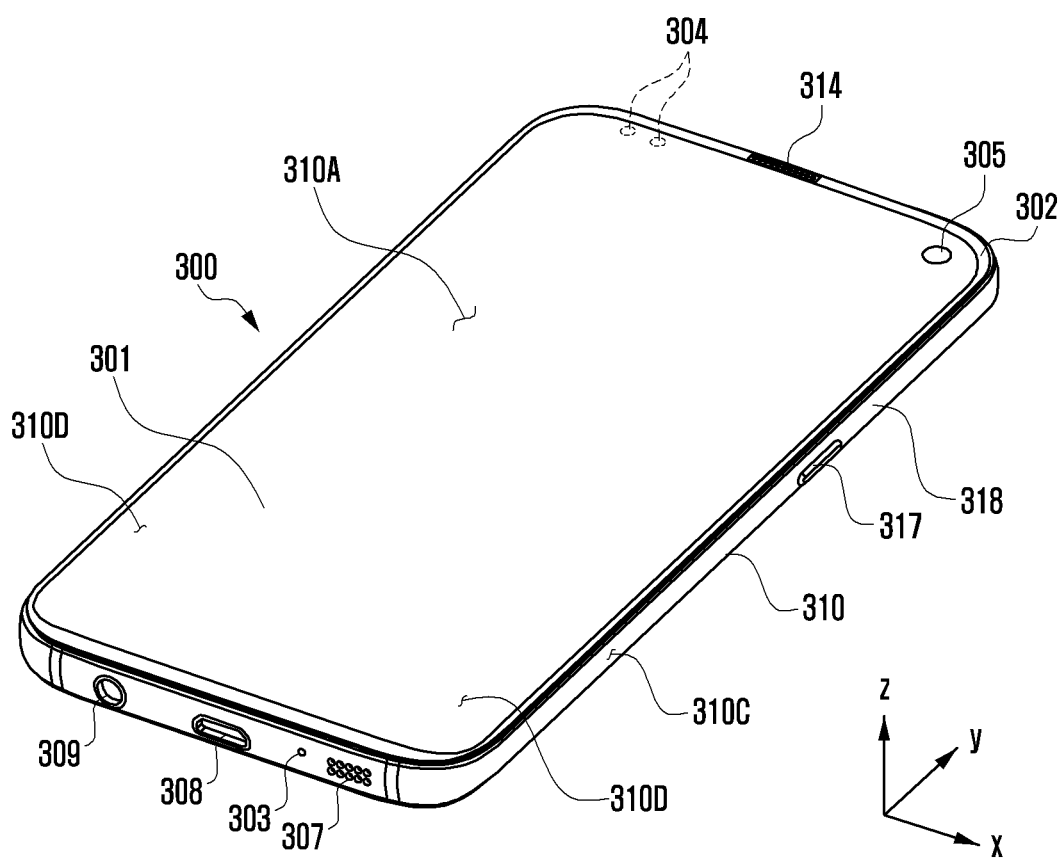
FIG. 3A is a perspective view of a mobile electronic device, according to various embodiments of the disclosure.
Figure 3B:
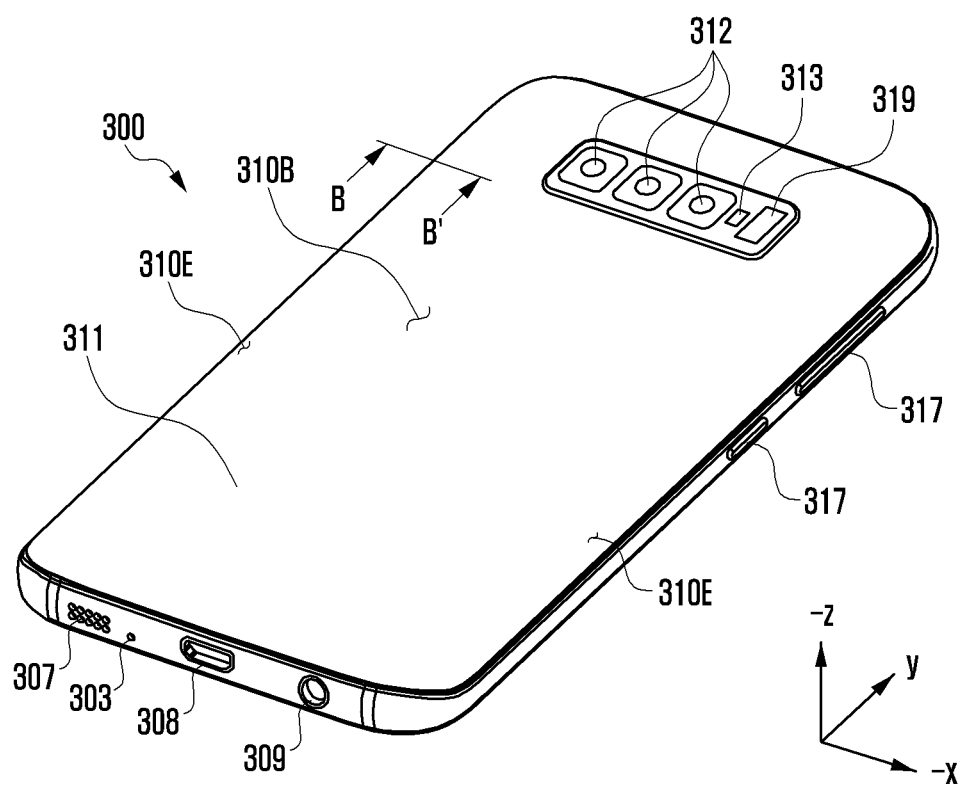
FIG. 3B is a rear perspective view of the mobile electronic device, according to various embodiments of the disclosure.

FIG. 3A is a front perspective view of a mobile electronic device according to various embodiments, and FIG. 3B is a rear perspective view of the mobile electronic device shown in FIG. 3A according to various embodiments.

The electronic device 300 in FIGS. 3A and 3B may be at least partially similar to the electronic device 101 in FIG. 1 or may further include various embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be visible through a substantial portion of the front plate 302, for example. At least a part of the display 301 may be visible through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the visible area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
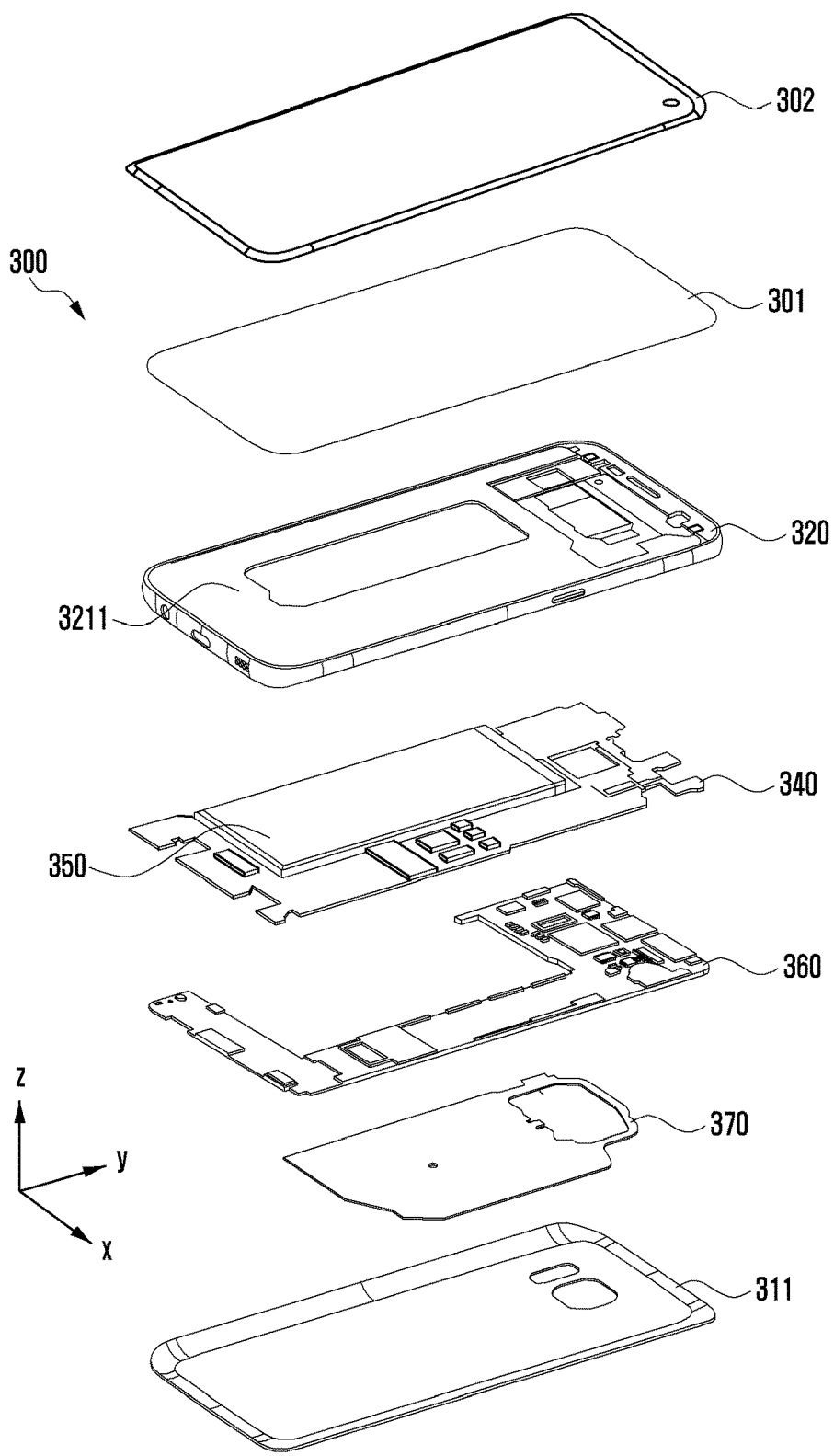
FIG. 3C is an exploded perspective view of the mobile electronic device, according to various embodiments of the disclosure.

FIG. 3C is an exploded perspective view illustrating the mobile electronic device shown in FIG. 3A according to various embodiments.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3a or FIG. 3b, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

FIG. 4A is a diagram illustrating an example structure of, for example, a third antenna module described with reference to FIG. 2 according to various embodiments. FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in an embodiment, the third antenna module 246 may include a printed circuit board 410, an antenna array 430, a RFIC 452, and a PMIC 454. The third antenna module 246 may further include a shield member 490. In various embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to an embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to an embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to an embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to an embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
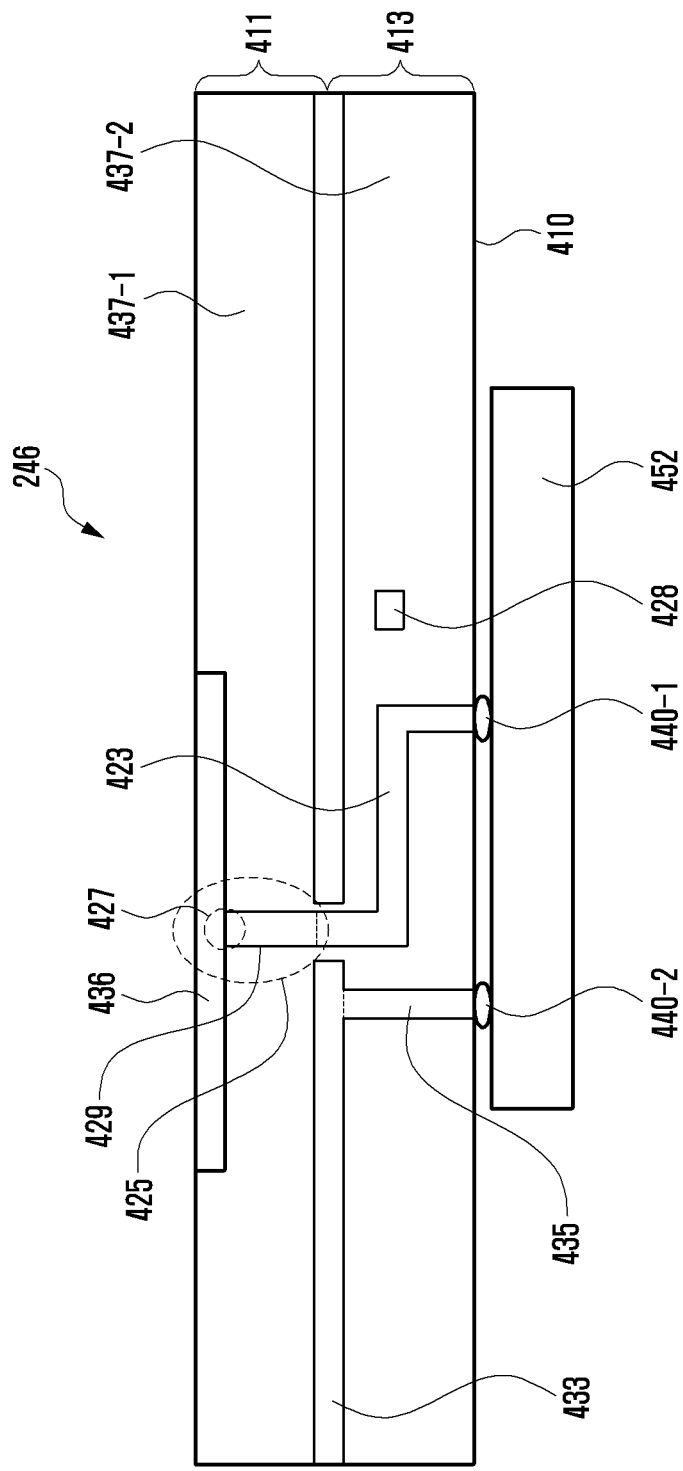
FIG. 4B is a cross-sectional view of the third antenna module, according to various embodiments of the disclosure illustrated in (a) of FIG. 4A taken along line Y-Y'.

FIG. 4B is a cross-sectional view illustrating the third antenna module 246 taken along line Y-Y' of FIG. 4A(a) according to various embodiments. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In various embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5:
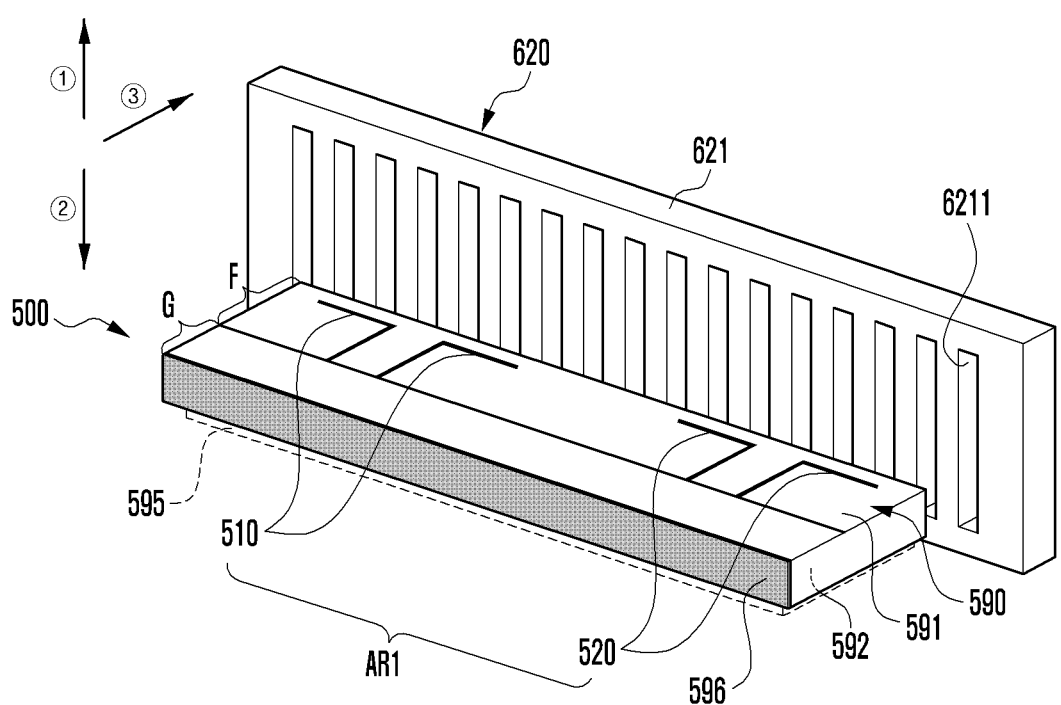
FIG. 5 is a perspective view of an antenna structure, according to various embodiments of the disclosure.

FIG. 5 is a perspective view of an antenna structure 500, according to various embodiments of the disclosure.

An antenna module including the antenna structure 500 and the wireless communication circuit 595 of FIG. 5 may be at least partially similar to the third antenna module 246 of FIG. 2, or may further include another embodiment of the antenna module.

Referring to FIG. 5, the antenna structure 500 may include an array antenna AR1 including a substrate 590 (e.g., a printed circuit board) and a plurality of antenna elements 510 and 520 disposed on the substrate 590. According to an embodiment, the substrate 590 may include a first surface 591 oriented in a first direction (direction ①) and a second surface 592 oriented in a second direction (direction ②) opposite to the first surface 591. According to an embodiment, the antenna elements 510 and 520 may each include a conductive pattern disposed in an inner space between the first surface 591 and the second surface 592 of the substrate 590. According to an embodiment, the antenna elements 510 and 520 may each include a dipole antenna. According to an embodiment, the antenna elements 510 and 520 may be disposed in a fill-cut area F, which is a non-conductive area separated from a ground area G of the substrate. In another embodiment, when the antenna elements 510 and 520 each include a conductive patch disposed on the substrate 590, the antenna elements 510 and 520 may be disposed at a position corresponding to the ground area G. According to an embodiment, the antenna structure 500 may include a conductor 596 (e.g., a reflector) disposed on the substrate 590 to be spaced apart from the antenna elements 510 and 520, and configured to reduce radiation loss due to a conductive structure disposed in the periphery and guide beams from the antenna structure 500 such that a beam pattern is formed in a desired direction.

According to various embodiments, the antenna structure 500 may include a wireless communication circuit 595 mounted on the second surface 592 of the substrate 590 and electrically connected to the antenna elements 510 and 520. In another embodiment, the wireless communication circuit 595 may be disposed in the inner space of the electronic device (e.g., the electronic device 300 in FIG. 3A) spaced apart from the antenna structure 500, and may be electrically connected to a printed circuit board (e.g., the printed circuit board 641 in FIG. 6) via a flexible substrate (e.g., a flexible printed circuit board (FPCB)).

According to various embodiments, the antenna structure 500 may be disposed in the inner space (e.g., the inner space 6001 in FIG. 6) of an electronic device (e.g., the electronic device 600 in FIG. 6) such that a beam pattern is formed to be directed in a third direction (direction ③) perpendicular to the first direction (direction ①) via the array antenna AR1. According to an embodiment, the third direction (direction ③) may include a direction in which the side frame 620 of the electronic device (e.g., the electronic device 600 of FIG. 6) is oriented. According to an embodiment, the wireless communication circuit 595 may be configured to transmit and/or receive a wireless signal in the frequency range of about 20 GHz to about 100 GHz via the array antenna AR1. In some embodiments, the wireless communication circuit 595 may be configured to transmit and/or receive a wireless signal in the frequency range of about 95 GHz to about 3 THz via the array antenna AR1. In some embodiments, the wireless communication circuit 595 may be configured to transmit and/or receive a wireless signal via the array antenna AR1 and in the frequency band in the range before and after 6 GHz (e.g., above and below 6 GHz bands) supported by mmWave (5G communication). According to an embodiment, each of the antenna elements 510 and 520 of the array antenna AR1 may radiate signals having equal or unequal phases and form a beam. According to an embodiment, the array antenna AR1 may include three or more antenna elements that radiate signals having equal or unequal phases and form a beam. As another embodiment, the array antenna AR1 may be replaced with one antenna element disposed on the substrate 590.

According to various embodiments, an electronic device (e.g., the electronic device 600 of FIG. 6) may include a conductive structure disposed in a beam pattern direction (e.g., direction ③) formed by the array antenna AR1 of the antenna structure 500. According to an embodiment, the conductive structure may include a conductive portion 621 of a side frame 620 (e.g., a side member) (e.g., the side bezel structure 318 in FIG. 3A) that defines at least a portion of the external appearance of the electronic device (e.g., the electronic device 600 in FIG. 6). According to an embodiment, the conductive portion 621 of the side frame 620 may include a plurality of slits 6211 that have a length, are disposed at least in an area corresponding to an area in which the beam pattern of the antenna structure 500 is formed, and are disposed to be spaced apart from each other. According to an embodiment, the plurality of slits 6211 may be disposed to have a length in a direction perpendicular to a polarization direction (e.g., horizontal polarization) of the array antenna AR1. Accordingly, the beam pattern of the array antenna AR1 is smoothly radiated to the outside through the plurality of slits 6211, thereby helping to improve the radiation performance of the array antenna AR1 that may be deteriorated by the conductive portion 621.

Figure 6:
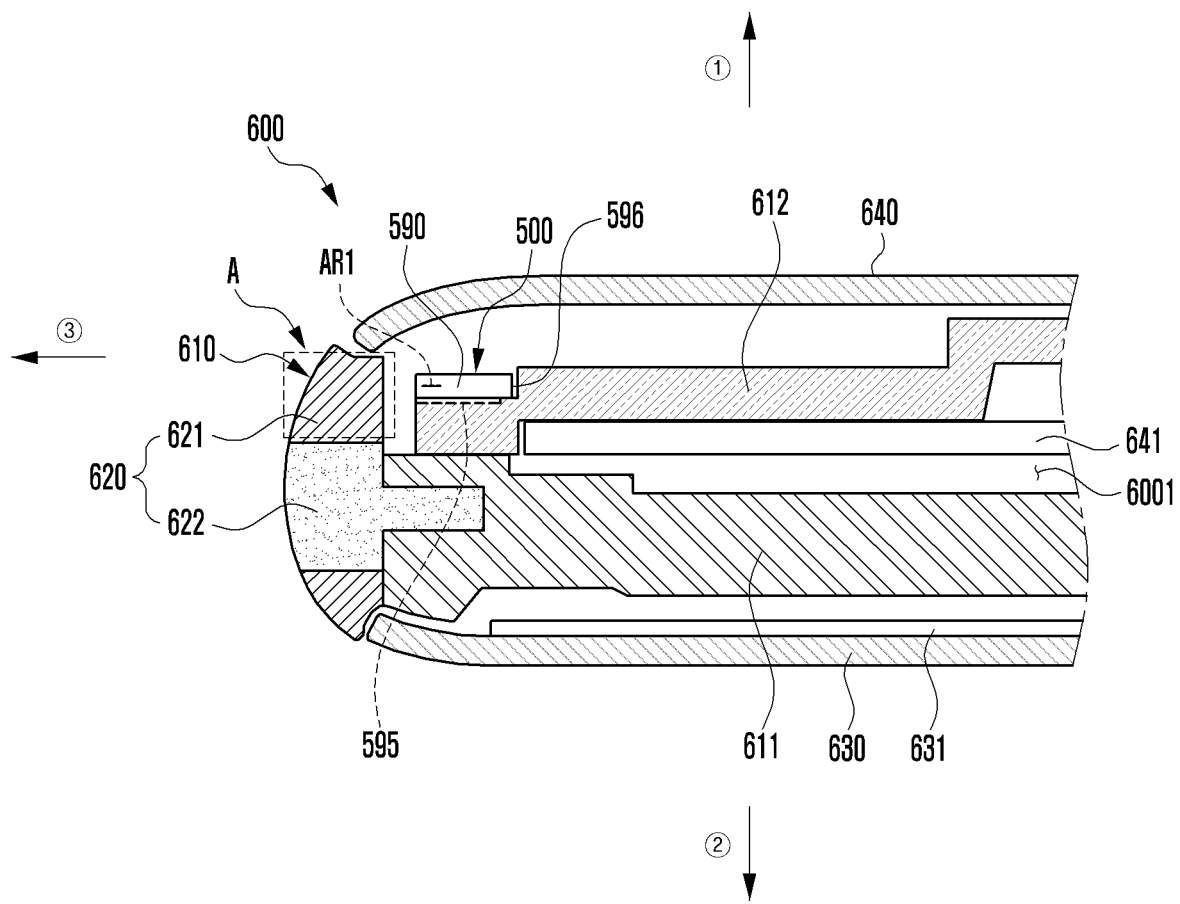
FIG. 6 is a partial cross-sectional view of an electronic device including an antenna structure, according to various embodiments of the disclosure.

FIG. 6 is a partial cross-sectional view of an electronic device 600 including an antenna structure 500, according to various embodiments of the disclosure. For example, FIG. 6 may be a partial cross-sectional view of the electronic device 300 taken along line B-B' of FIG. 3B.

The electronic device 600 of FIG. 6 may be at least partially similar to the electronic device 101 of FIG. 1 or the electronic device 300 of FIG. 3A, or may further include another embodiment of the electronic device.

Referring to FIG. 6, the electronic device 600 (e.g., the electronic device 300 in FIG. 3A) may include a housing 610 (e.g., the housing 310 in FIG. 3A) that includes a front cover 630 (e.g., the front plate 302 in FIG. 3A) (e.g., a first cover or a first plate) oriented in a second direction (direction ②) (e.g., the z-axis direction in FIG. 3A), a rear cover 640 (e.g., the rear plate 311 in FIG. 3B) (e.g., a second cover or a second plate) oriented in a first direction (direction ①) (e.g., the −z-axis direction in FIG. 3B) opposite to the front cover 630, and a side frame 620 (e.g., the side bezel structure 318 in FIG. 3A) (e.g., a side member) surrounding a space 6001 between the front cover 630 and the rear cover 640. According to an embodiment, the side frame 620 may include an at least partially disposed conductive portion 621 and/or a polymer portion 622 injection-molded (e.g., insert injection-molded or double injection-molded) to the conductive portion 621. As another embodiment, the polymer portion 622 may be replaced with a void or another dielectric material. As another embodiment, the polymer portion 622 may be structurally coupled to the conductive portion 621. According to various embodiments, the side frame 620 may include a support bracket 611 (e.g., the first support structure 3211 in FIG. 3C) (e.g., a support member) extending from the side frame 620 into at least a portion of the space 6001. According to an embodiment, the support bracket 611 may extend from the side frame 620 into the space 6001 or may be provided by structural coupling with the side frame 620. According to an embodiment, the support bracket 611 may extend from the conductive portion 621. According to an embodiment, the support bracket 611 may include a polymer member and/or a conductive member to which the polymer member is at least partially injection-molded. According to an embodiment, the support bracket 611 may support at least a portion of a printed circuit board 641 (e.g., the printed circuit board 340 in FIG. 3C) (e.g., a main substrate) and/or a display 631 (e.g., the display 301 of FIG. 3C) disposed in the inner space 6001. As another embodiment, the support bracket 611 may be disposed to support at least a portion of a battery (e.g., the battery 350 in FIG. 3C) disposed in the space 6001. According to an embodiment, the display 631 may be disposed in the space 6001 of the electronic device 600 to be visible from the outside through at least a portion of the front cover 630.

According to various embodiments, the antenna structure 500 may include a substrate 590 and an array antenna AR1 disposed on the substrate 590 and including antenna elements (e.g., antenna elements 510 and 520 in FIG. 5) (e.g., conductive patterns) operating as dipole antennas. According to an embodiment, the substrate 590 of the antenna structure 500 may be disposed to be at least partially supported by the dielectric structure 612 disposed in the space 6001 of the electronic device 600. According to an embodiment, the substrate 590 may be disposed in the space 6001 of the electronic device 600 in a direction parallel to the rear cover 640 and/or the front cover 630. According to an embodiment, the array antenna AR1 may be disposed on the substrate 590 to form a beam pattern in the third direction (direction ③) which is perpendicular to the first direction (direction ①) and in which the side frame 620 is oriented. As another embodiment, the array antenna AR1 may be disposed to form a beam pattern to the space between the third direction (direction ③) and the second direction (direction ②) as well as in the third direction (direction ③). As another embodiment, the array antenna AR1 may be disposed to form a beam pattern to the space between the third direction (direction ③) and the first direction (direction ①) as well as in the third direction (direction ③).

According to various embodiments, the electronic device 600 may include a side frame 620 at least partially including a conductive portion 621 to secure a pleasing appearance and to reinforce rigidity. According to an embodiment, if the conductive portion 621 of the side frame 620 is disposed at a position corresponding to the direction (direction ③) in which the beam pattern of the antenna structure 500 is formed, the radiation performance of the array antenna AR1 may be deteriorated or may not radiate beams in a predetermined direction (e.g., direction ③ in which the side frame is oriented).

According to an exemplary embodiment of the disclosure, the electronic device 600 may include a plurality of slits (e.g., the plurality of slits 6211 in FIG. 5) provided in a first area (area A) of the conductive portion 621 of the side frame 620 corresponding to the array antenna AR1. According to an embodiment, the plurality of slits (e.g., the plurality of slits 6211 in FIG. 5) may have a length and may be spaced apart from each other. According to an embodiment, the plurality of slits (e.g., the plurality of slits 6211 in FIG. 5) may be provided to have a length in a direction perpendicular to the polarization (e.g., horizontal polarization) of the array antenna AR1. Accordingly, in the array antenna AR1, a beam pattern is formed through the plurality of slits (e.g., the plurality of slits 6211 in FIG. 5) provided in the conductive portion 621 of the side frame 620. Thus, the directivity and/or gain in a predetermined direction may be increased, and the radiation performance may be improved. In some embodiments, as illustrated, the first area (area A) of the conductive portion 621 to which the plurality of slits of the side frame 620 (e.g., the plurality of slits 6211 in FIG. 5) are applied has a thickness that may be gradually increased. As another embodiment, the thickness of the first area (area A) may be gradually decreased. As another embodiment, the first area (area A) may have a constant thickness as shown in FIG. 5.

Figure 7A:
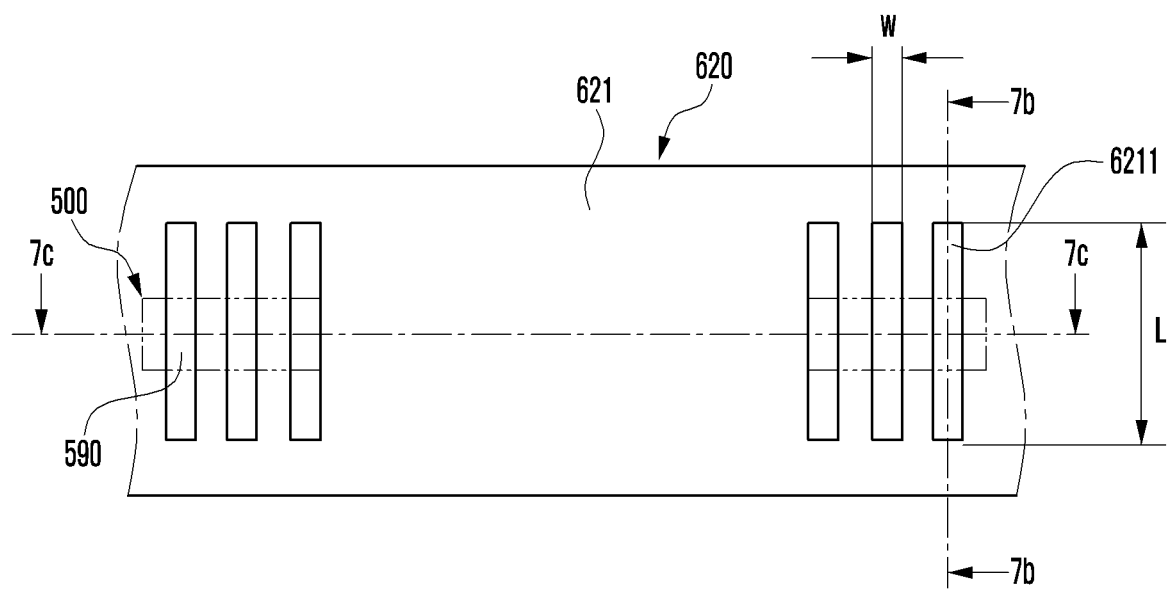
FIG. 7A is a partial plan view of a side frame, according to various embodiments of the disclosure.
Figure 7B:
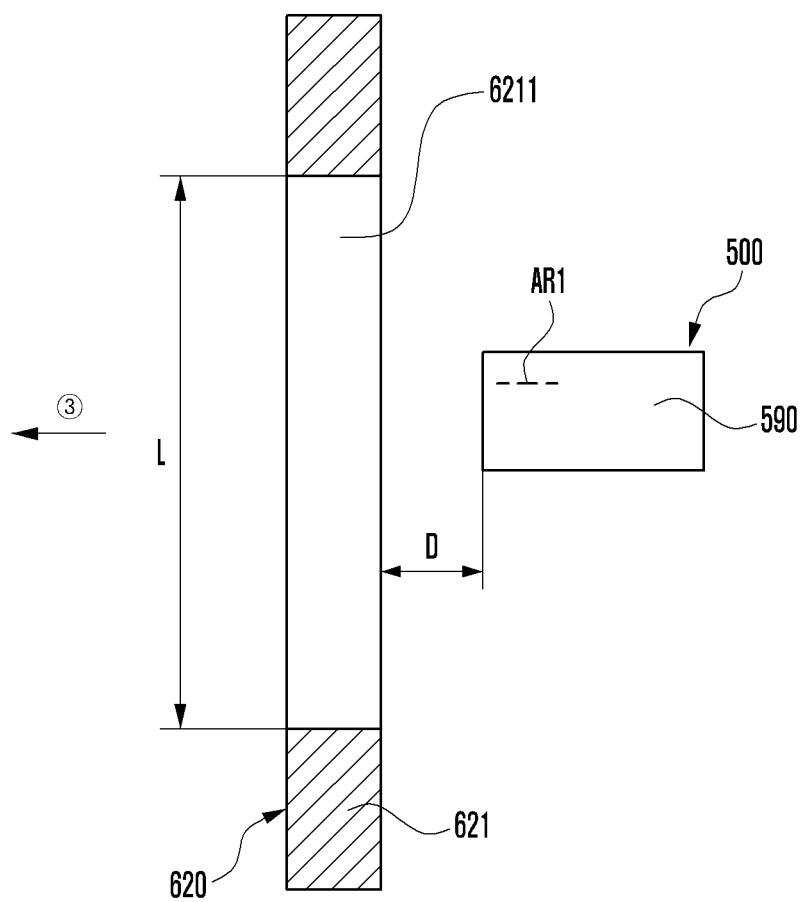
FIG. 7B is a cross-sectional view of the side frame, according to various embodiments of the disclosure, taken along line 7b-7b of FIG. 7A.
Figure 7C:
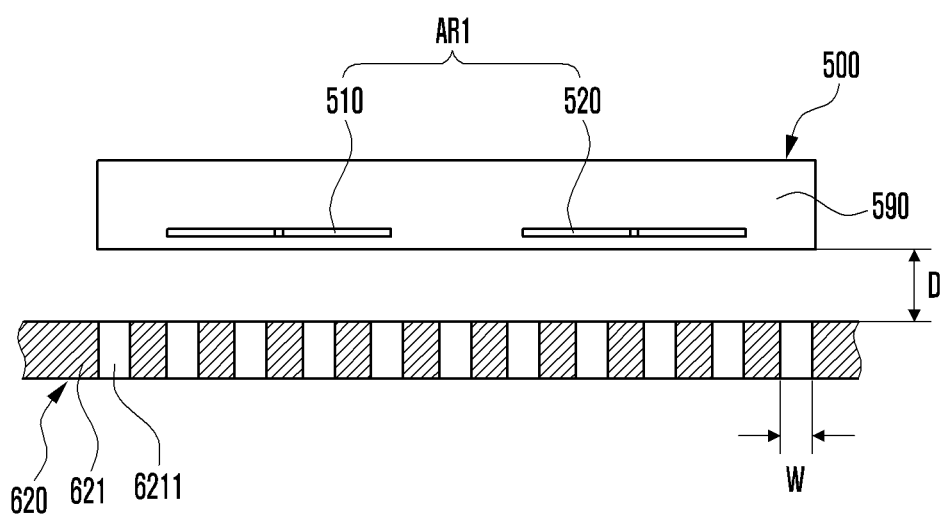
FIG. 7C is a cross-sectional view of the side frame, according to various embodiments of the disclosure, taken along line 7c-7c of FIG. 7A.

FIG. 7A is a partial plan view of the side frame 620, according to various embodiments of the disclosure. FIG. 7B is a cross-sectional view of the side frame 620, according to various embodiments of the disclosure taken along line 7b-7b in FIG. 7A. FIG. 7C is a cross-sectional view of the side frame 620, according to various embodiments of the disclosure, taken along line 7c-7c in FIG. 7A.

Referring to FIGS. 7A to 7C, the side frame 620 may include a plurality of slits 6211 disposed on the conductive portion 621. According to an embodiment, the plurality of slits 6211 may be provided to have a length in a direction perpendicular to a polarization direction (e.g., horizontal polarization) of the array antenna AR1 included in the antenna structure 500. According to an embodiment, the lengths L and widths W of the plurality of respective slits 6211 may be equal to each other. As another embodiment, lengths L and widths W of the plurality of respective slits 6211 may be unequal to each other. According to an embodiment, the plurality of respective slits may be disposed at equal or unequal intervals. According to an embodiment, the plurality of slits 6211 may be disposed to overlap at least the antenna structure 500 when the side frame 620 is viewed from the outside. As another embodiment, the plurality of slits 6211 may be provided at least in a number that overlaps the array antenna AR1 including the plurality of antenna elements 510 and 520 when the side frame 620 is viewed from the outside.

According to various embodiments, the antenna structure 500 may be disposed to cross the centers of the plurality of slits 6211 when the side frame 620 is viewed from the outside. As another embodiment, the antenna structure 500 may be disposed to be biased upward or downward with respect to the centers of the plurality of slits 6211 when the side frame 620 is viewed from the outside. In this case, the beam pattern of the antenna structure 500 may be tilted upward and/or downward in a predetermined direction.

According to various embodiments, the radiation performance of the antenna structure 500 may be determined depending on the size of the length L and/or the width W of the plurality of slits 6211. For example, as shown in Table 1, it can be seen that, when the antenna structure 500 has the same separation distance D (e.g., a separation distance of 0.5 mm) with respect to the side frame 620 and the same width W (e.g., a width of 0.5 mm), the gain of the antenna structure 500 is improved as the length L of the slits increases. In addition, it can be seen that, when the length of the slits 6211 is changed to 4.8 mm in the state in which the separation distance D between the antenna structure 500 and the side frame 620 is fixed (e.g., in the state of being fixed to 0.5 mm), the gain is rapidly decreased, which may mean that the radiation performance of the antenna structure 500 is significantly deteriorated when the length of the slits 6211 is changed to 4.8 mm or less. Accordingly, the length L of the slits 6211 may be 5.8 mm or more. According to an embodiment, the width W of the slits 6211 may be 0.5 mm or more in consideration of easy workability. As another embodiment, the width W of the slits 6211 may be in the range of 0.6 mm to 0.8 mm. According to an embodiment, the size of the slits 6211 capable of forming an effective radiation opening (e.g., opening) capable of radiating a beam pattern through the conductive portion 621 of the side frame 620 is variable by the length of a wavelength that is inversely proportional to a frequency.

TABLE 1

| L (mm) | D (mm) | Gain in main radiation direction (dB) |
|---|---|---|
| 6.8 | 2.7 | 7.68 |
| 6.8 | 1 | 9.05 |
| 6.8 | 0.5 | 9.20 |
| 5.8 | 0.5 | 7.95 |
| 4.8 | 0.5 | 0.84 |
| Removing conductive portion | | 6.2 |

Figure 8:
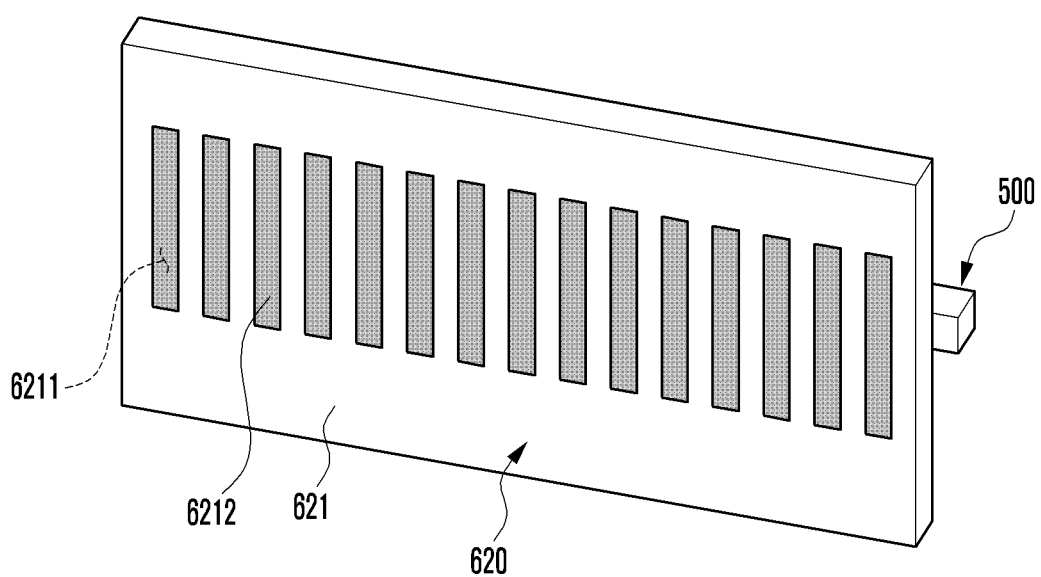
FIG. 8 is a partial perspective view of the side frame in which a dielectric material is filled in a plurality of slits, according to various embodiments of the disclosure.

FIG. 8 is a partial perspective view of a side frame 620 in which a dielectric material 6212 is filled in a plurality of slits 6211, according to various embodiments of the disclosure.

Referring to FIG. 8, the side frame 620 may include a dielectric material 6212 filled in the plurality of slits 6211 formed in the conductive portion 621. According to an embodiment, the dielectric material 6212 may be formed of a material having a dielectric constant $\varepsilon_0$ greater than 1 (e.g., air). For example, since the dielectric material 6212 having a high dielectric constant is applied to the plurality of slits 6211, it is possible to prevent the inflow of foreign substances. According to an embodiment, the dielectric material 6212 may include a polymer (e.g., polyamide) having a dielectric constant in the range of about 4 to 10 or an aluminum oxide (e.g., $Al_2O_3$) produced by oxidizing the peripheries of the slits 6211 in the side frame 620 made of a metal material. According to an embodiment, the aluminum oxide may be used as a ceramic material.

According to various embodiments, by using a phenomenon in which the wavelength is shortened when a dielectric material having a high dielectric constant is filled in the slits, it is possible to configure the antenna structure such that the plurality of slits have a short length while implementing the same or higher gain. For example, through this configuration, reducing the length of the slits required to form the effective radiation opening may help reinforce the rigidity of the side frame.

The following Table 2 shows gains of the antenna structure 500 obtained when the length L of a plurality of slits 6211 is changed in the state in which the dielectric material 6212 having the same separation distance D and the same dielectric constant co as the antenna structure 500 is filled in the plurality of slits 6211 in the inner space (e.g., the inner space 6001 in FIG. 6) of an electronic device (e.g., the electronic device 600 in FIG. 6). As described, it can be seen that, when the dielectric constant co of the dielectric material 6212 is 4.3, the change in the gain of the antenna structure 500 is insignificant even if the length L of the slits 6211 is reduced to 3.5 mm. Furthermore, when the dielectric material 6212 has the same separation distance D as the antenna structure 500 and when the dielectric constant co of the dielectric material 6212 increases, for example, when the dielectric material 6212 having a dielectric constant of 9.8 is applied, it can be seen that, even if the length L of the slits 6211 is reduced to 2.5 mm, the antenna structure 500 exhibits a gain equivalent to that obtained in the case where the conductive portion 621 is removed. Therefore, when the dielectric material 6212 having a high dielectric constant in the range of about 4 to 10 is applied to the plurality of slits 6211, the length L of the plurality of slits 6211 may be reduced to about 2.5 mm. This may mean that applying the dielectric material 6212 to the slits 6212 may help reinforce the rigidity and appearance quality of the side frame 620. In addition, this may mean that the combination of the plurality of slits 6211 and the dielectric material 5212 may be helpful for the improvement of the radiation performance of the antenna structure 500 by serving as a radio wave lens.

TABLE 2

| L (mm) | D (mm) | Dielectric constant of high dielectric material ($\varepsilon_0$) | Gain in main radiation direction (dB) |
|---|---|---|---|
| 4.8 | 0.5 | 1 (air) | 0.84 |
| 4.8 | 0.5 | 4.3 | 8.70 |
| 4.0 | 0.5 | 4.3 | 9.49 |
| 3.5 | 0.5 | 4.3 | 8.50 |
| 3 | 0.5 | 4.3 | −0.61 |
| 3 | 0.5 | 6.15 | 8.2 |
| 2.5 | 0.5 | 6.15 | −0.59 |
| 2.5 | 0.5 | 9.8 | 6.14 |
| Removing conductive portion | | | 6.2 |

Figure 9:
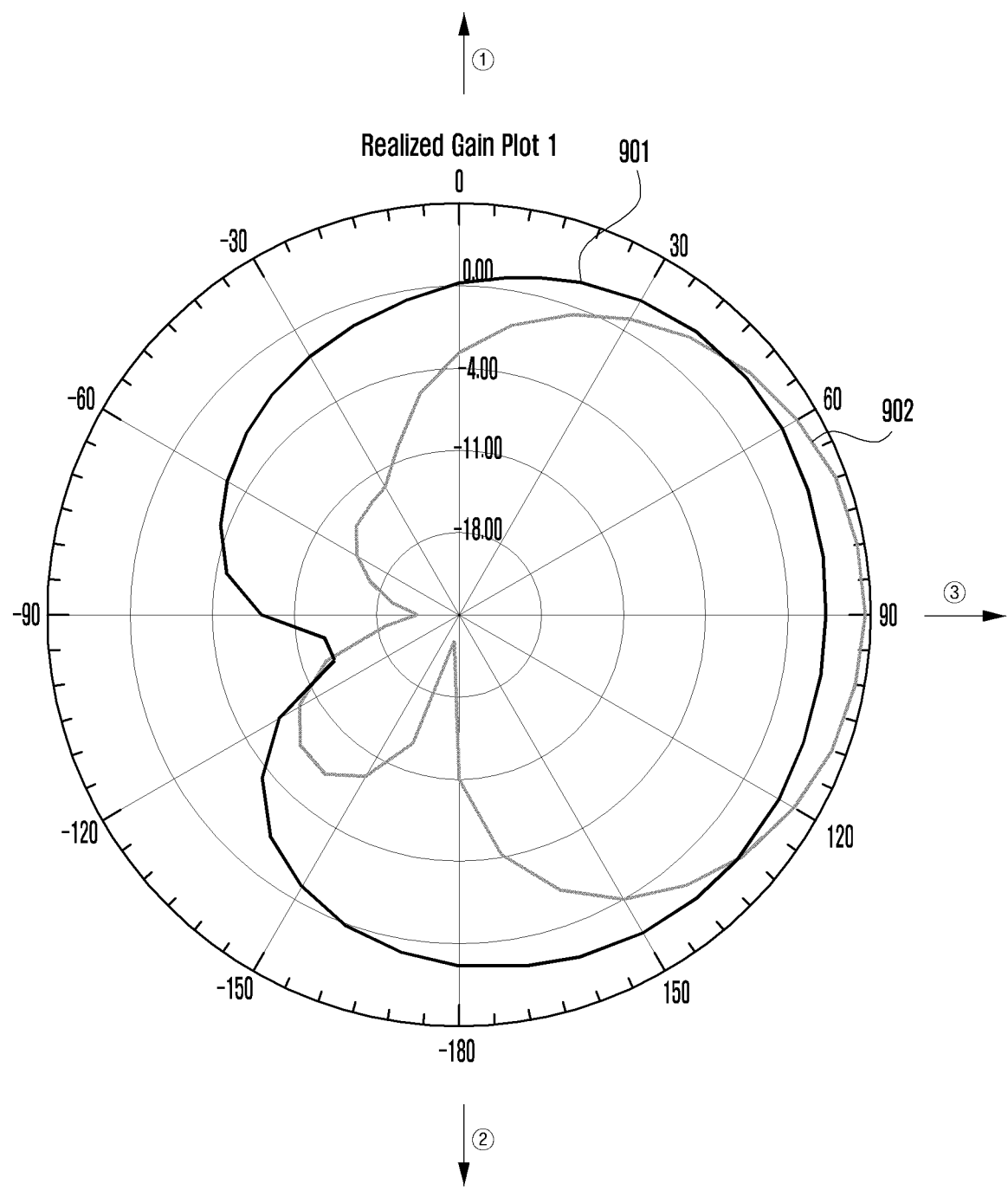
FIG. 9 is a radiation pattern diagram of an antenna structure in which the case where a conductive portion is not present in a side frame, according to various embodiments of the disclosure, and the case where a conductive portion including a plurality of slits including a dielectric material is present are compared with each other.

FIG. 9 is a radiation pattern diagram of the antenna structure 500 in which the case where a conductive portion 621 is not present in a side frame 620, according to various embodiments of the disclosure, and the case where a conductive portion 621 including a plurality of slits 6211 including a dielectric material 6212 is present are compared with each other.

FIG. 9 is a diagram in which a radiation pattern of an antenna structure 500 in the case where a conductive portion 621 is not present (e.g., pattern 901) and a radiation pattern of an antenna structure 500 after a dielectric material 6212 made of polyamide is applied to the slits 6211 having a length L of 4 mm are compared with each other (e.g., pattern 902). It can be seen that a relatively high performance is secured in the main radiation direction (e.g., direction ③) in the antenna structure 500 corresponding to the conductive portion 621 including the slits 6211 to which the dielectric material 6212 is applied.

Figure 10A:
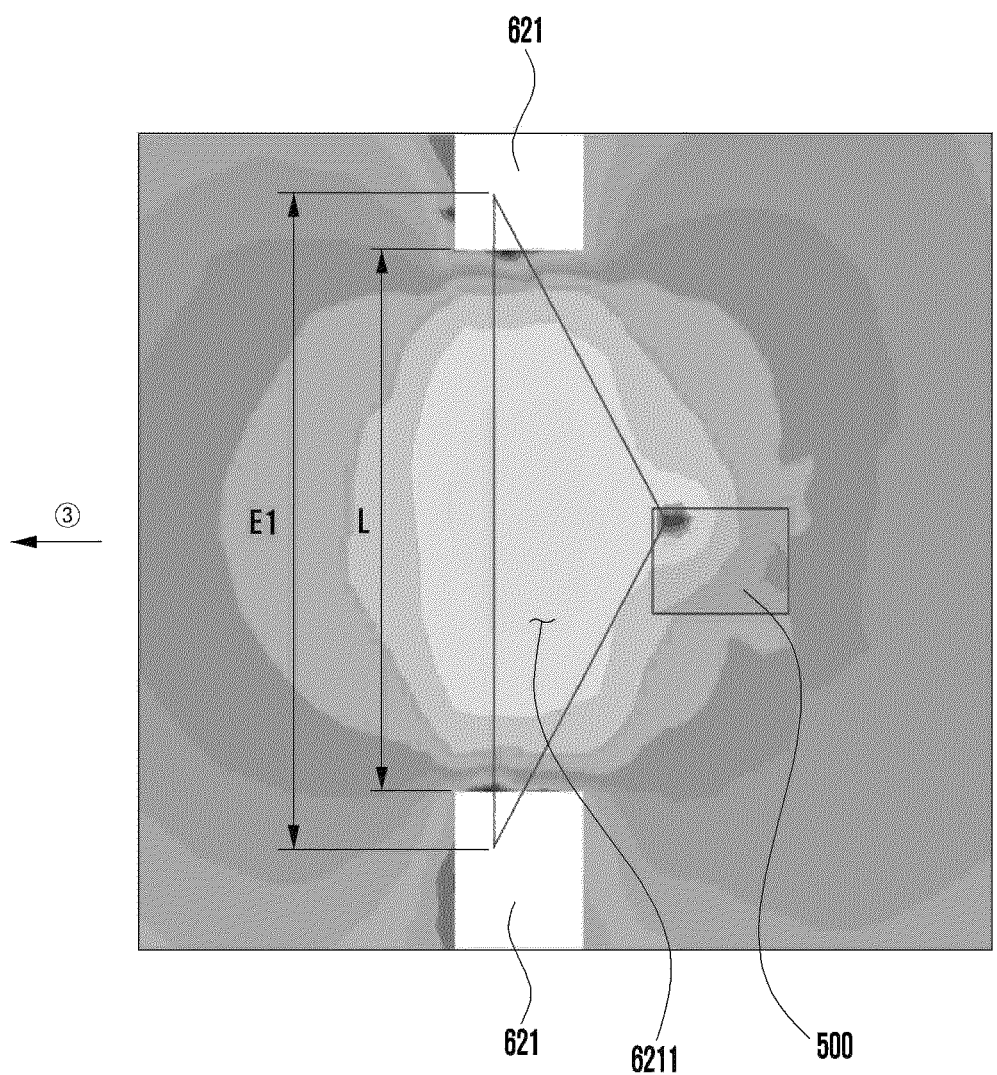
FIGS. 10A and 10B are views illustrating electric field distributions (e-field distributions) of antenna structures depending on the presence or absence of the dielectric material of the plurality of slits provided in the conductive portion of the side frame, according to various embodiments of the disclosure.
Figure 10B:
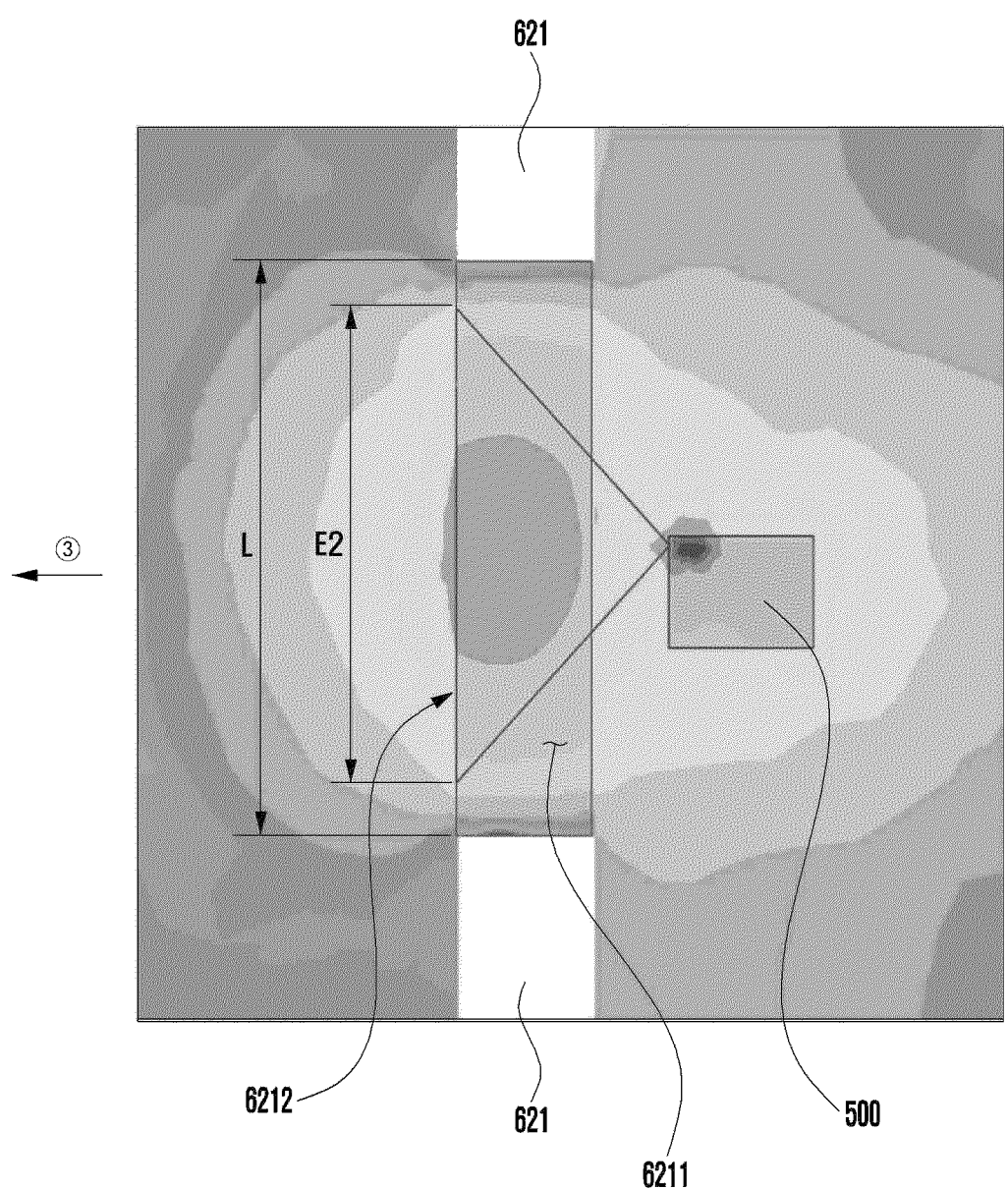

FIGS. 10A and 10B are views illustrating electric field distributions (e-field distributions) of antenna structures 500 depending on the presence and/or absence of the dielectric material 6212 of the plurality of slits 6211 provided in the conductive portion 621 of the side frame 620, according to various embodiments of the disclosure.

FIG. 10A is a view illustrating an electric field distribution of the antenna structure 500 obtained via the plurality of slits 6211 in which the dielectric material 6212 is not present. It can be seen that since the length E1 of the effective radiation opening is longer than the length L of the slits 6211, the radiation signal of the antenna structure 500 is stored between the slits 6211 and then radiated to both sides of the slits 6211 rather than passing through the slits 6211, the performance in the main radiation direction (direction ③) of the antenna structure 500 is deteriorated.

In contrast, FIG. 10B is a view illustrating an electric field distribution of the antenna structure 500 obtained via the plurality of slits 6211 including the dielectric material 6212. It is shown that the length E2 of the effective radiation opening becomes smaller than the length L of the slits 6211 via the dielectric material 6212 having a high dielectric constant, so that a radiation signal formed in the antenna structure 500 is smoothly radiated in a predetermined direction. For example, it can be seen that since the dielectric material 6212 having a high dielectric constant acts as a director, the antenna structure 500 forms the e-field strongly in the main radiation direction (direction ③). This may mean that when the dielectric material 6212 having a high dielectric constant is applied to the plurality of slits 6211, the radiation performance of the antenna structure 500 is relatively improved compared to the case in which the dielectric material is not applied.

Figure 11:
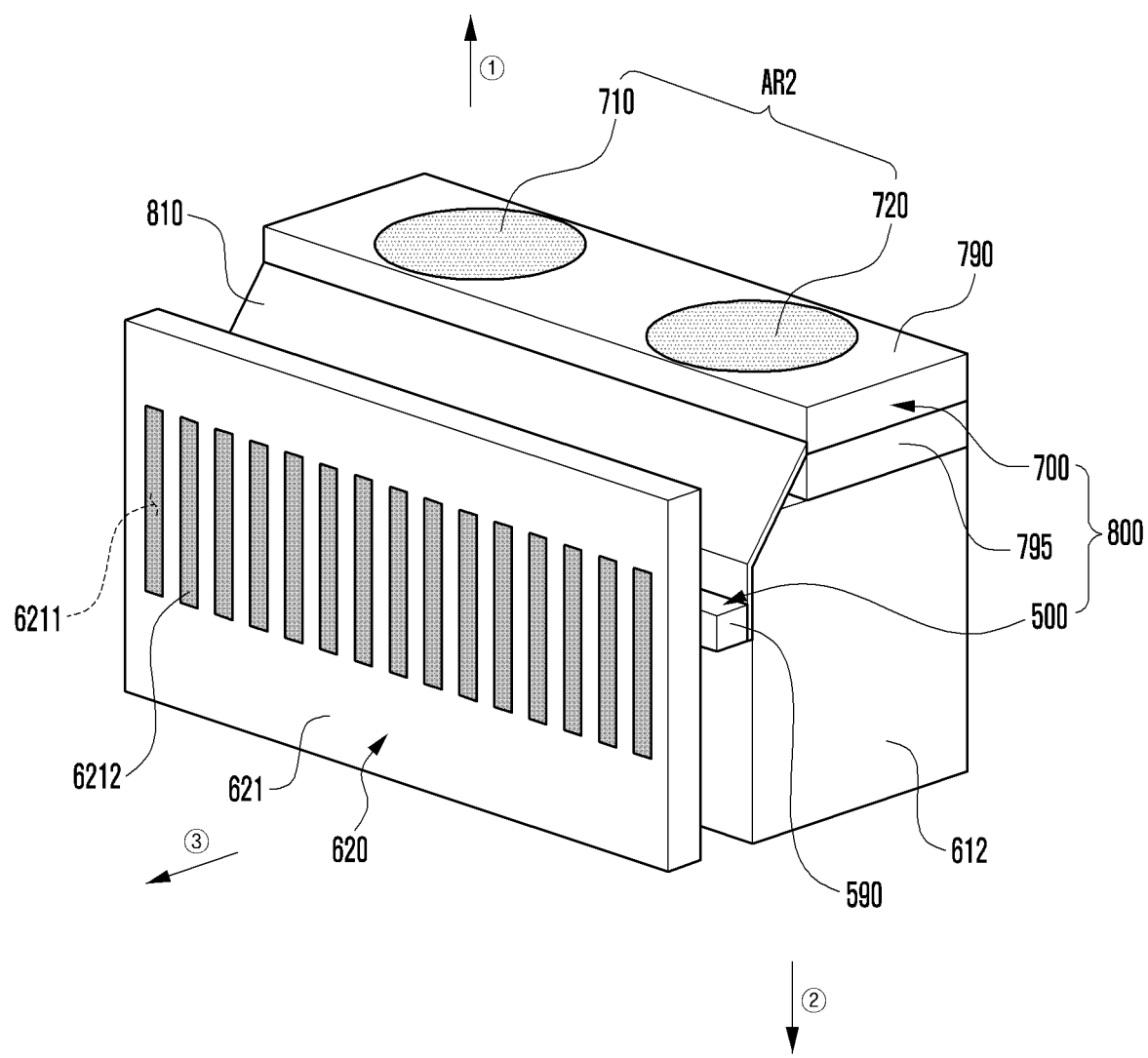
FIG. 11 is a perspective view schematically illustrating an arrangement relationship between an antenna structure and a conductive portion of a side frame, according to various embodiments of the disclosure.

FIG. 11 is a perspective view schematically illustrating an arrangement relationship between an antenna structure 800 and a conductive portion 621 of a side frame 620, according to various embodiments of the disclosure.

Figure 12:
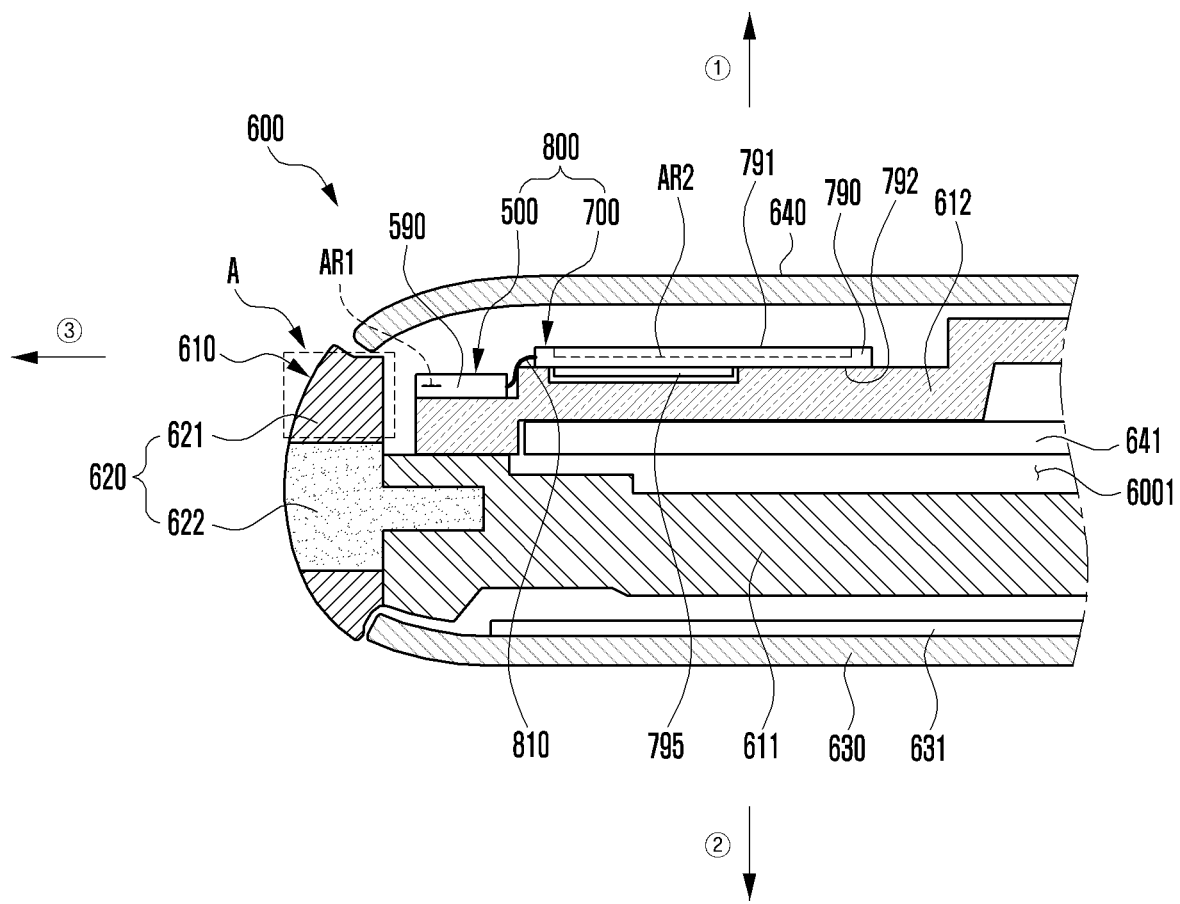
FIG. 12 is a partial cross-sectional view of an electronic device including the antenna structure of FIG. 11, according to various embodiments of the disclosure.

FIG. 12 is a partial cross-sectional view of an electronic device including the antenna structure 800 of FIG. 11, according to various embodiments of the disclosure. For example, FIG. 12 may be a partial cross-sectional view of the electronic device 300 taken along line B-B' of FIG. 3B.

In the description made with reference to FIGS. 11 and 12, the components that are substantially the same as those illustrated in FIGS. 5 and 6 are assigned with the same reference numerals, and overlapping detailed descriptions may be omitted.

Referring to FIGS. 11 and 12, the electronic device 600 may include an antenna structure 800 that is disposed while being supported by the dielectric structure 612 disposed in the inner space 6001. According to an embodiment, the antenna structure 800 may include a first antenna structure 500 including a first substrate 590 disposed to be supported by the dielectric structure 612 and a first array antenna AR1 disposed on the first substrate 590 to form a beam pattern in a third direction (direction ③) via the plurality of slits 6211 provided in the conductive portion 621 of the side frame 620, a second antenna structure 700 including a second substrate 790 disposed to be supported by the dielectric structure 612 and a second array antenna AR2 disposed on the second substrate 790 to form a beam pattern in a first direction (direction ①) in which the rear cover 640 is oriented, and an electrical connection member 810 electrically connecting the first antenna structure 500 and the second antenna structure 700 to each other. According to an embodiment, the electrical connection member 810 may include a flexible substrate (e.g., a flexible printed circuit board (FPCB), a coaxial cable, or an FPCB type RF cable (FRC) connecting the first substrate 590 and the second substrate 790 to each other.

According to various embodiments, the first array antenna AR1 may include a plurality of first antenna elements (e.g., the antenna elements 510 and 520 in FIG. 5) disposed on the first substrate 590 to be spaced apart from each other. According to an embodiment, the plurality of first antenna elements 510 and 520 may be dipole antennas and may include conductive patterns. In some embodiments, the first substrate 590 may be replaced with a flexible substrate (FPCB).

According to various embodiments, the second array antenna AR2 may include a plurality of second antenna elements 710 and 720 disposed on the second substrate 790 to be spaced apart from each other. According to an embodiment, the plurality of first antenna elements 710 and 720 may be patch antennas and may include conductive patches. In some embodiments, the first array antenna AR1 may be replaced with conductive patches, and the second array antenna AR2 may be replaced with conductive patterns.

According to various embodiments, the second substrate 790 may include a third surface 791 facing the rear cover 640 and a fourth surface 792 facing the front cover 630. According to an embodiment, the plurality of second antenna elements 710 and 720 may be disposed in the space between the third surface 791 and the fourth surface 792 of the second substrate 790 to be closer to the third surface 791. According to an embodiment, the wireless communication circuit 795 (e.g., the wireless communication circuit 595 of FIG. 5) may be disposed on the fourth surface 792 of the second substrate 790. According to an embodiment, the wireless communication circuit 795 may be disposed to be protected by a shielding member. According to an embodiment, the shielding member may include a conformal shielding for placing an injection molded product on a shield can or electrical elements (e.g., an RFIC and/or a PMIC) and coating a conductive member. According to an embodiment, the shielding member may block external noise or block noise emitted from electrical elements disposed on the second substrate from being transmitted to the outside. According to an embodiment, the wireless communication circuit 795 may be electrically connected to the plurality of first antenna elements 510 and 520 via the plurality of second antenna elements 710 and 720 and the electrical connection member 810. According to an embodiment, the wireless communication circuit 795 may be configured to transmit and/or receive a wireless signal in a frequency range of about 20 GHz to 100 GHz via the first array antenna AR1 and/or the second array antenna AR2. In some embodiments, the wireless communication circuit 795 may be configured to transmit and/or receive a wireless signal in a frequency range of about 95 GHz to 3 THz via the first array antenna AR1 and/or the second array antenna AR2. In some embodiments, the wireless communication circuit 795 may be configured to transmit and/or receive a wireless signal via the first array antenna AR1 and/or the second array antenna AR2 and in the frequency band in the range before and after 6 GHz (e.g., above and below 6 GHz bands) supported by mmWave (5G communication). According to an embodiment, each of the antenna elements 510, 520, 710, and 720 of the first array antenna AR1 and/or the second array antenna AR2 may have equal and/or unequal phases and form beam patterns in a predetermined direction. According to an embodiment, the first array antenna AR1 and/or the second array antenna AR2 may include three or more antenna elements having equal or unequal phases and forming beams. In another embodiment, each of the first array antenna AR1 and the second array antenna AR2 may be replaced with one antenna element that is disposed on each of the first substrate 590 and the second substrate 790.

According to various embodiments, the first array antenna AR1 may be disposed such that a beam pattern is formed in the third direction (direction ③) via an area (area A) including the plurality of slits 6211 provided in the conductive portion 621 of the side frame 620. According to an embodiment, the plurality of slits 6211 may be filled with a dielectric material 6212 having a high dielectric constant. According to an embodiment, the second array antenna AR2 may be disposed such that a beam pattern is formed in the first direction (direction ①) via the rear cover 640 made of a dielectric material. In some embodiments, the second array antenna AR2 may be disposed such that a beam pattern is formed in the second direction (direction ②) via at least a portion of the front cover 630 (e.g., a BM area of the display) at least partially formed of a dielectric material. For example, the first array antenna AR1 and the second array antenna AR2 may be configured to form beam patterns in predetermined various directions by changing the support structure of the dielectric structure 612 and/or the support structure of the substrates 590 and 790. In some embodiments, the plurality of slits 6211 may be formed as empty spaces (e.g., air) without the dielectric material 6212.

In some embodiments, as illustrated in FIG. 12, the first area (area A) of the conductive portion 621 to which the plurality of slits 6211 of the side frame 620 are applied has a thickness that may be gradually increased. As another embodiment, the thickness of the first area (area A) may be gradually decreased. As another embodiment, the first area (area A) may have a constant thickness as shown in FIG. 11.

Figure 13:
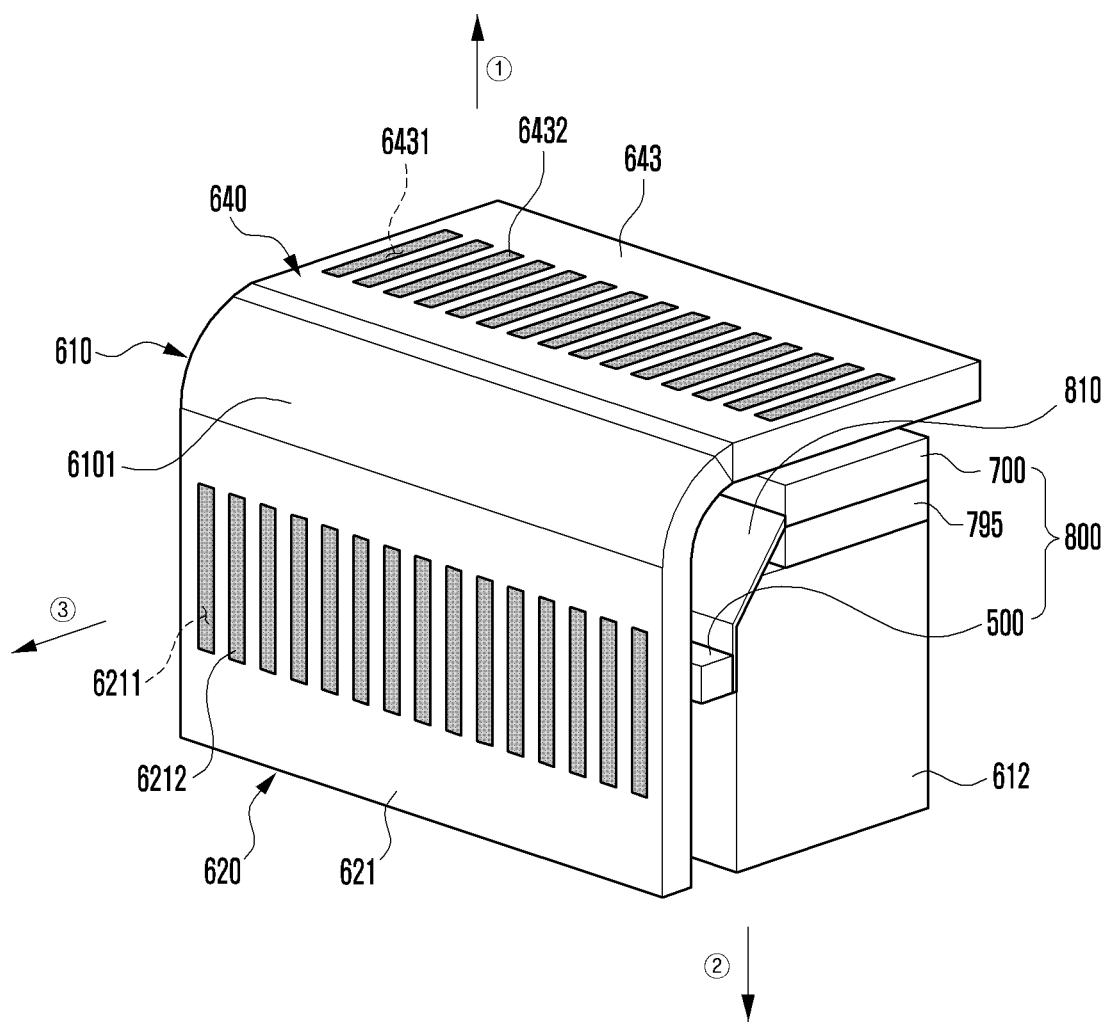
FIG. 13 is a perspective view schematically illustrating an arrangement relationship between an antenna structure and a first conductive portion of a side frame and a second conductive portion of a rear cover, according to various embodiments of the disclosure.

FIG. 13 is a perspective view schematically illustrating an arrangement relationship between an antenna structure 800 and a first conductive portion 621 of a side frame 620 and a second conductive portion 643 of a rear cover 640, according to various embodiments of the disclosure.

Figure 14:
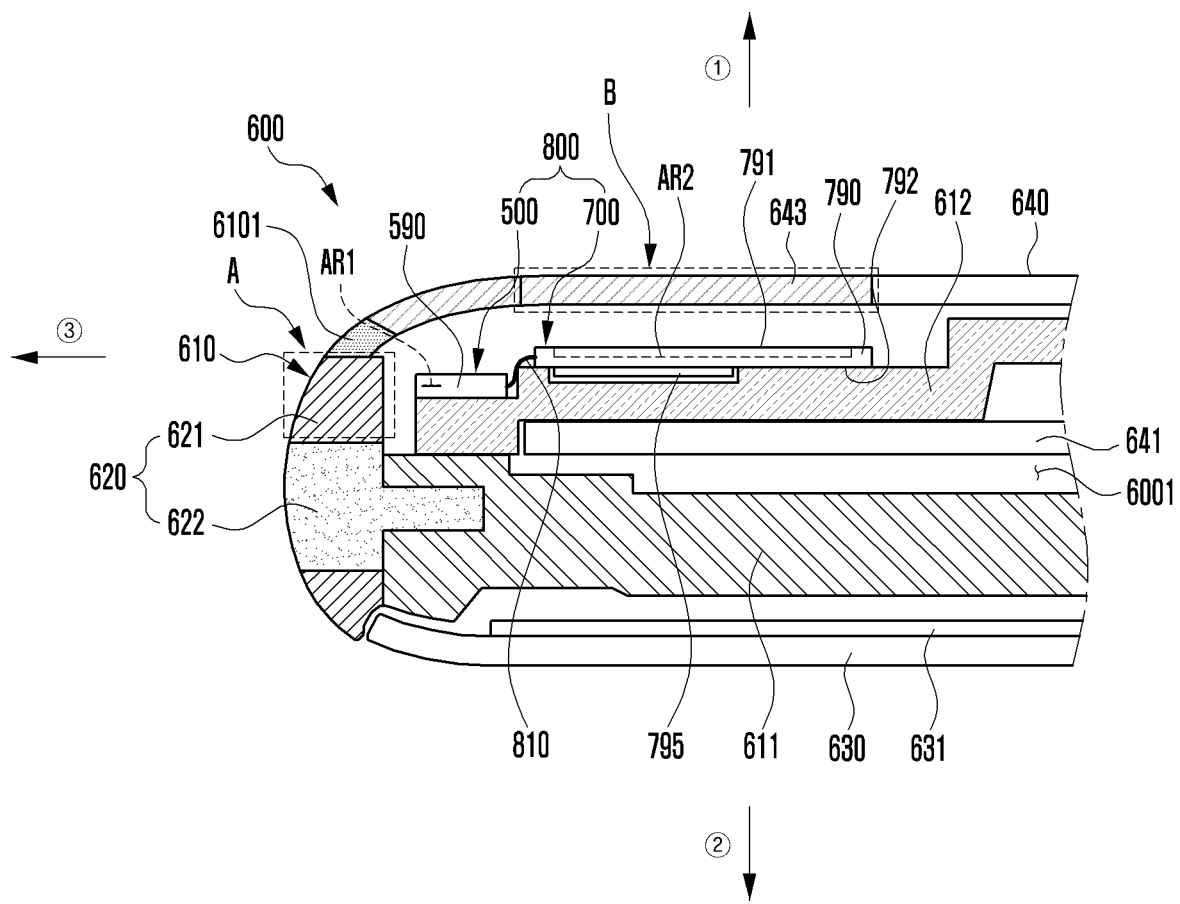
FIG. 14 is a partial cross-sectional view of an electronic device including the antenna structure of FIG. 13, according to various embodiments of the disclosure.

FIG. 14 is a partial cross-sectional view of an electronic device 600 including the antenna structure 800 of FIG. 13, according to various embodiments of the disclosure. For example, FIG. 14 may be a partial cross-sectional view of the electronic device 300 taken along line B-B' of FIG. 3B.

In the description made with reference to FIGS. 13 and 14, the components that are substantially the same as those of the antenna structure 800 illustrated in FIGS. 11 and 12 are assigned with the same reference numerals, and overlapping detailed descriptions may be omitted.

Referring to FIGS. 13 and 14, the electronic device 600 may include a side frame 620 and a housing 610 including a front cover 630 and a rear cover 640 connected to the side frame 620. According to an embodiment, the side frame 620 may include a first conductive portion 621 (e.g., the conductive portion 621 in FIG. 11) including a plurality of first slits 6211 (e.g., the plurality of slits 6211 in FIG. 11). According to an embodiment, the rear cover 640 may include a second conductive portion 643 including a plurality of second slits 6431. According to an embodiment, the second conductive portion 643 may be formed as a portion of the rear cover 640 made of a dielectric material. As another embodiment, the second conductive portion 643 may be disposed to be embedded in the inner surface, the outer surface, or between the inner surface and the outer surface of the rear cover 640 made of a dielectric material. In another embodiment, when the second conductive portion 643 is disposed on the outer surface of the rear cover 640, the second conductive portion 643 may be used as a conductive decoration member. In some embodiments, the first conductive portion 621 and the second conductive portion 643 may extend integrally. In some embodiments, the first conductive portion 621 and the second conductive portion 643 may be electrically insulated via a non-conductive portion 6101 (e.g., an injection-molded product).

According to various embodiments, the first antenna structure 500 may include a first array antenna AR1 disposed on the first substrate 590 supported by the dielectric structure 612 in the inner space 6001 of the electronic device 600. According to an embodiment, the first array antenna AR1 may be configured such that a beam pattern is formed in the third direction (direction ③) via the plurality of first slits 6211 in the first conductive portion 621. According to an embodiment, the second antenna structure 700 may include a second array antenna AR2 disposed on the second substrate 790 supported by the dielectric structure 612 in the inner space 6001 of the electronic device 600. According to an embodiment, the second array antenna AR2 may be configured such that a beam pattern is formed in the first direction (direction ①) via the plurality of second slits 6431 in the second conductive portion 643 disposed in the corresponding area (area B) of the rear cover 640. According to an embodiment, the plurality of first slits 6211 may be filled with a first dielectric material 6212 having a high dielectric constant. According to an embodiment, the plurality of second slits 6431 may be filled with a second dielectric material 6432 having a high dielectric constant. According to an embodiment, the dielectric constants of the first dielectric material 6212 and the second dielectric material 6432 may be the same as or different from each other. In some embodiments, the plurality of first slits 6211 and/or the plurality of second slits 6431 may be formed as empty spaces (e.g., air) without dielectric materials 6212 and 6432.

In some embodiments, as illustrated in FIG. 14, the first area (area A) of the conductive portion 621 to which the plurality of slits 6211 of the side frame 620 are applied has a thickness that may be gradually increased. As another embodiment, the thickness of the first area (area A) may be gradually decreased. As another embodiment, the first area (area A) may have a constant thickness as shown in FIG. 13.

Figure 15:
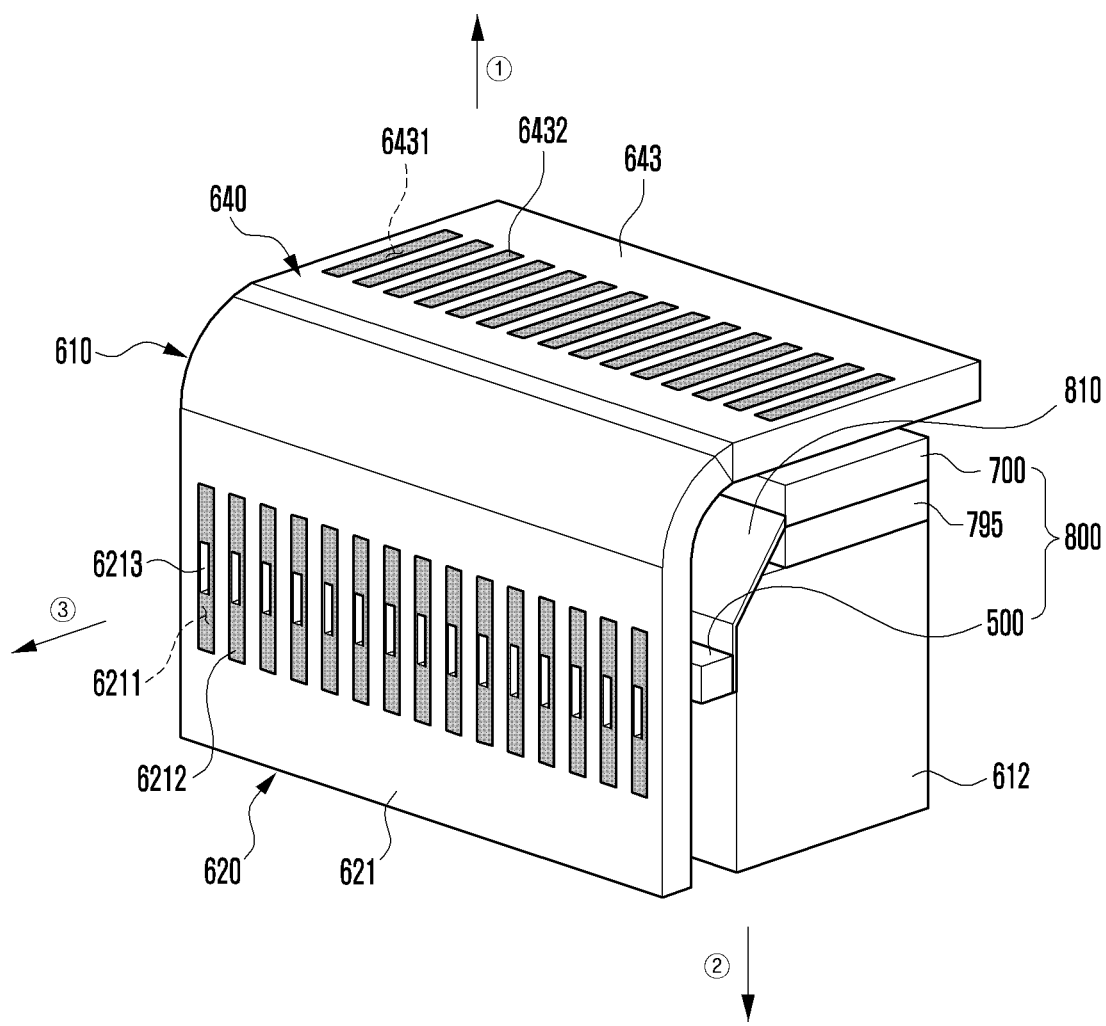
FIG. 15 is a perspective view illustrating a state in which a dielectric material including an acoustic hole is filled in slits provided in a conductive portion of a side frame, according to various embodiments of the disclosure.

FIG. 15 is a perspective view illustrating a state in which the slits 6211 provided in the conductive portion 621 of the side frame 620, according to various embodiments of the disclosure, are each filled with a dielectric material 6212 including an acoustic hole 6213.

Figure 16:
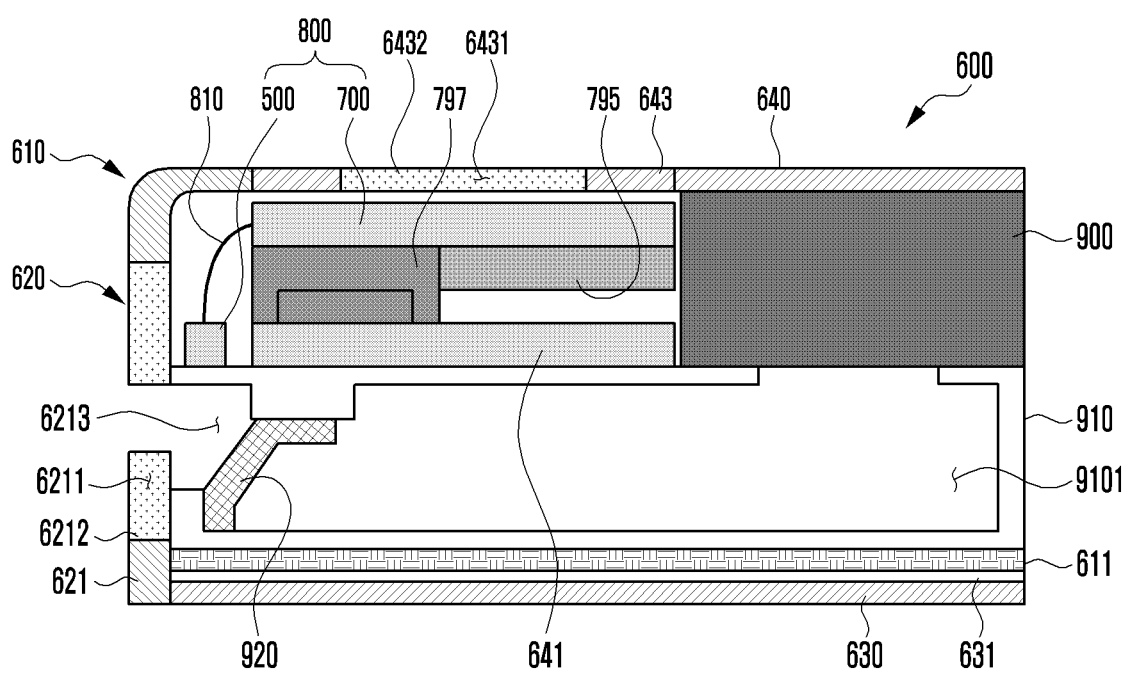
FIG. 16 is a partial cross-sectional view of an electronic device including the antenna structure of FIG. 15, according to various embodiments of the disclosure.

FIG. 16 is a partial cross-sectional view of an electronic device 600 including the antenna structure 800 of FIG. 15, according to various embodiments of the disclosure.

In the description made with reference to FIGS. 15 and 16, the components that are substantially the same as those of the antenna structure 800 and the housing 610 illustrated in FIGS. 13 and 14 are assigned with the same reference numerals, and overlapping detailed descriptions may be omitted.

Referring to FIGS. 15 and 16, the electronic device 600 may include a plurality of first slits 6211 provided in the conductive portion 621 of the side frame 620. According to an embodiment, the plurality of first slits 6211 may be at least partially filled with a first dielectric material 6212 having a high dielectric constant. According to an embodiment, the side frame 620 may include at least one acoustic hole 6213 formed in the first dielectric material 6212. According to an embodiment, the acoustic hole 6213 may be used as an acoustic conduit for sound emitted from the acoustic module 900 disposed in the inner space 6001 of the electronic device 600 or transmitted to the acoustic module 900. In another embodiment, the acoustic hole 6213 may be used as an external environment detection passage for a sensor module such as, but not limited to, a temperature sensor, a humidity sensor, an odor sensor, or a barometric pressure sensor that detects an external environmental state in the inner space 6001 of the electronic device 600.

According to various embodiments, the electronic device 600 may include, in the inner space 6001, an acoustic module enclosure 910 including an acoustic module 900 provided through a structural change of a dielectric structure (e.g., the dielectric structure 612 of FIG. 13). According to an embodiment, the acoustic module 900 may include a speaker device and/or a microphone device. According to an embodiment, the acoustic module enclosure 910 may include a resonance space 9101 connected to the acoustic module 900. According to an embodiment, the resonance space 9101 may be connected to the acoustic holes 6213 provided in the plurality of conductive slits 6211. According to an embodiment, the electronic device 600 may include a partition wall 920 for spatially separating the resonance space 9101 and the acoustic holes 6213. According to an embodiment, the partition wall 920 may prevent moisture or foreign substances introduced from the acoustic holes 6213 from flowing into the electronic device 600. According to an embodiment, the partition wall 920 may include at least one of a mesh, a nonwoven fabric, a Gore-Tex, and a membrane. According to an embodiment, the partition wall 920 may connect the resonance space 9101 to the acoustic holes 6213 by using at least one of double-sided tape, rubber, urethane, and silicone.

According to various embodiments, the first antenna structure 500 may include a first array antenna AR1 disposed on the first substrate 590 supported by the acoustic module enclosure 910 in the inner space 6001 of the electronic device 600. According to an embodiment, the first array antenna AR1 may be configured such that a beam pattern is formed in the third direction (direction ③) via at least some of the plurality of first slits 6211 in the first conductive portion 621. According to an embodiment, the second antenna structure AR2 may include a second array antenna AR2 disposed on the second substrate 790 supported by the acoustic module enclosure 910 in the inner space 6001 of the electronic device 600. According to an embodiment, the second substrate 790 may be disposed to be electrically connected to the printed circuit board 641 via an electrical connector 797. According to an embodiment, the second array antenna AR2 may be configured such that a beam pattern is formed in the first direction (direction ①) via the plurality of second slits 6431 in the second conductive portion 643 disposed on the rear cover 640. At the same time, the sound emitted from the acoustic module 900 may be emitted to the outside of the electronic device 600 through the resonance space 9101 and the acoustic holes 6213. As another embodiment, the acoustic holes 6213 may be provided through the second dielectric material 6432 in the plurality of second slits 6431 provided in the second conductive portion 643 of the rear cover 640 according to the arrangement structure of the acoustic module 900.

Figure 17A:
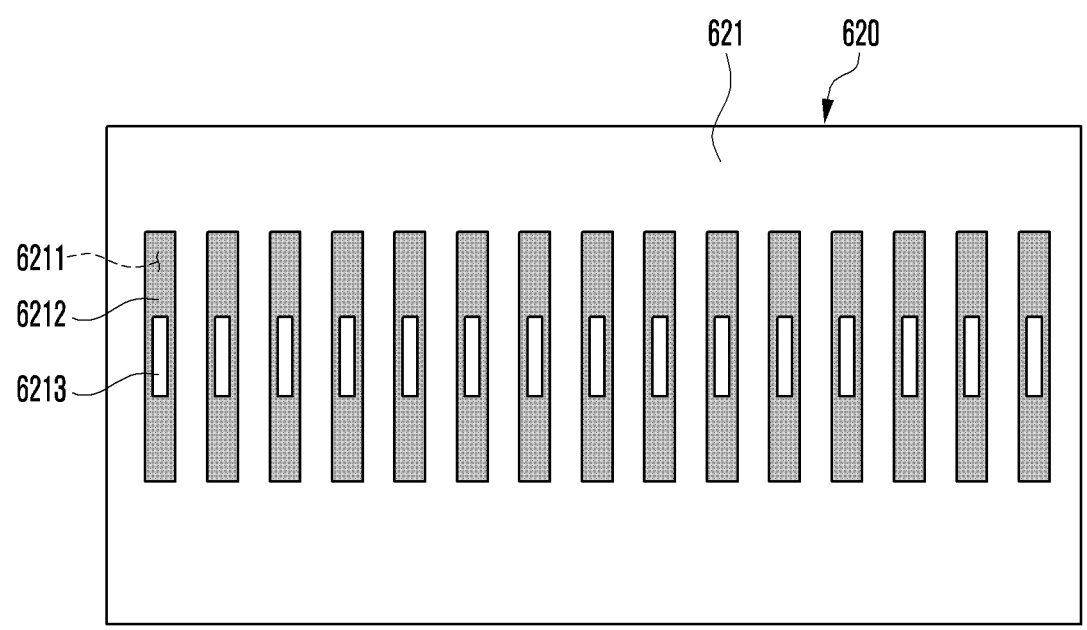
FIGS. 17A and 17B are partial plan views each illustrating a conductive portion of a side frame including acoustic holes, according to various embodiments of the disclosure.
Figure 17B:
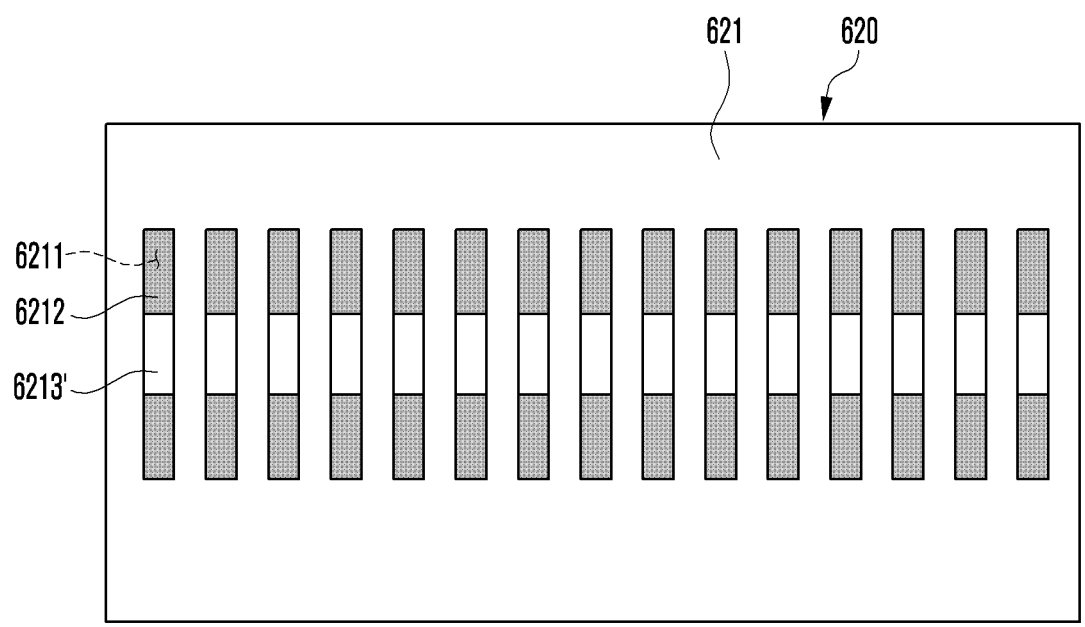

FIGS. 17A and 17B are partial plan views each illustrating a conductive portion 621 of a side frame 620 including acoustic holes 6213 or 6213', according to various embodiments of the disclosure.

Referring to FIG. 17A, the side frame 620 may include a conductive portion 621 including a plurality of slits 6211. According to an embodiment, each of the plurality of slits 6211 in the conductive portion 621 may be filled with a dielectric material 6212 having a high dielectric constant. According to an embodiment, the side frame 620 may include acoustic holes 6213 provided in the plurality of slits 6211 through structural change of the dielectric material 6212. According to an embodiment, the acoustic holes 6213 may be formed in a rectangular shape having a length in a direction parallel to the longitudinal direction of the plurality of slits 6211. As another embodiment, the acoustic holes 6213 may be formed in a square shape. As another embodiment, the acoustic holes 6213 may be formed in a circular shape, an oval shape, or a polygonal shape. According to an embodiment, the acoustic holes 6213 may each have a size that allows all inner surfaces of the acoustic holes 6213 to be in contact with the dielectric material 6212. For example, the acoustic holes 6213 may each have a size to be in contact with the dielectric material 6212 on all four inner surfaces.

Referring to FIG. 17B, the acoustic holes 6213' may each be configured to have a size that allows at least some of the inner surfaces thereof to be in contact the conductive portion through a structural change of the dielectric material 6212. For example, the acoustic holes 6213' may each have a size that allows the left and right inner surfaces to be in contact with the conductive portion 621. In this case, the acoustic holes 6213 or 6213' may have equal or unequal lengths. According to an embodiment, the side frame 620 may include breathable waterproof members that are disposed on the rear surface of the side frame 620 at positions facing the acoustic holes 6213 or 6213' to allow sound to pass therethrough and to block moisture and/or foreign substances. According to an embodiment, the breathable waterproof members may include at least one of a Gore-Tex material, a waterproof non-woven material, and a membrane.

Although not illustrated, through a shape change of the dielectric material, at least two acoustic holes may be provided per one slit to be spaced apart from each other.

Figure 18:
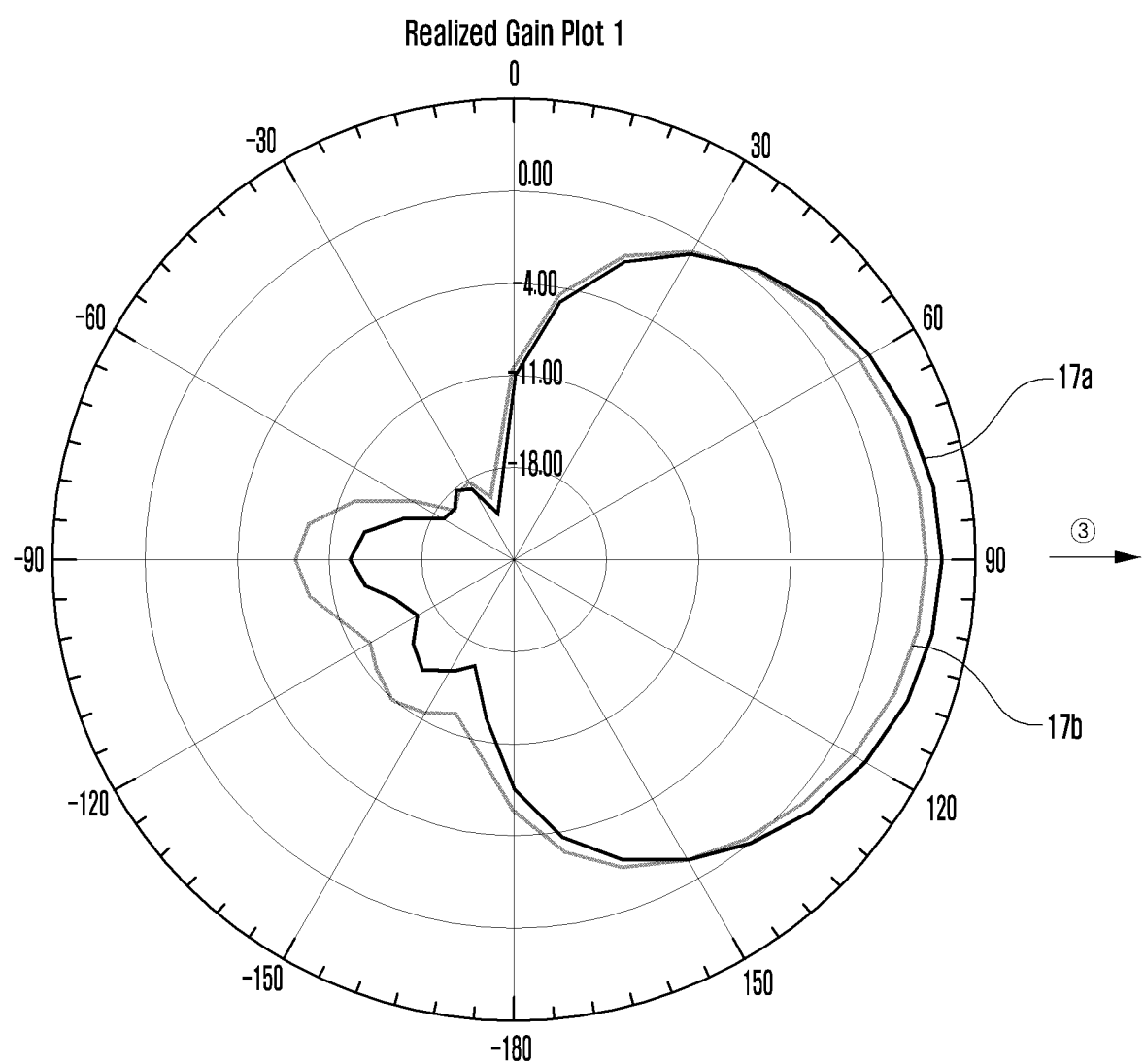
FIG. 18 is a radiation pattern diagram for the antenna structures having the configurations of FIGS. 17A and 17B, according to various embodiments of the disclosure.

FIG. 18 is a radiation pattern diagram for the antenna structures having the configurations of FIGS. 17A and 17B, according to various embodiments of the disclosure.

Referring to FIG. 18, it can be seen that, under the condition in which the plurality of slits have the same length, the radiation performance (e.g., the pattern 17a) in the case of FIG. 17A in which the beam pattern of the antenna structure (e.g., the first antenna structure 500 in FIG. 16) is formed through the plurality of slits 6211 including acoustic holes 6213 each of which is configured to have a size that allows all four inner surfaces thereof to be in contact with the dielectric material 6212 is superior to the radiation performance (e.g., the pattern 17b) in the case of FIG. 17B in which the beam pattern of the antenna structure (e.g., the first antenna structure 500 in FIG. 16) is formed through the plurality of slits 6211 including acoustic holes 6213' each of which is configured to have a size that allows only two inner surfaces thereof to be in contact with the dielectric material

6212. This may mean that, even if acoustic holes 6213 are provided in the plurality of slits 6211, an antenna structure in which a beam pattern is formed via slits 6211 having a larger area filled with a dielectric material 6212 having a high dielectric constant (e.g., the first antenna 500 in FIG. 16) may have a relatively superior radiation performance.

Figure 19:
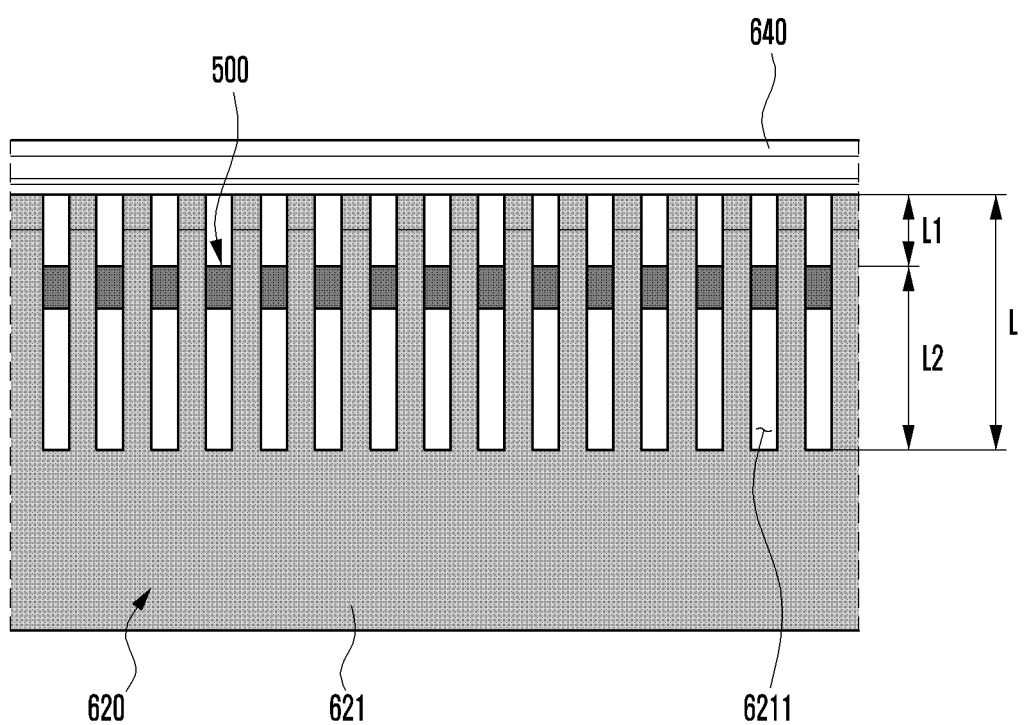
FIG. 19 is a view illustrating an arrangement relationship between a plurality of slits in a side frame and an antenna structure, according to various embodiments of the disclosure.

FIG. 19 is a view illustrating an arrangement relationship between a plurality of slits 6211 in a side frame 620 and an antenna structure 500, according to various embodiments of the disclosure.

Referring to FIG. 19, the antenna structure 500 may be disposed to overlap the slits in a direction perpendicular to the longitudinal direction of the slits 6211 when the side frame 620 is viewed from the outside. According to an embodiment, the antenna structure 500 may be disposed at the centers of the slits 6211 to realize an excellent performance. As another embodiment, the antenna structure 500 may be disposed to be biased to one side from the centers of the slits 6211. As illustrated, the antenna structure 500 may be disposed to be biased toward the rear cover 640 when the side frame 620 is viewed from the outside. For example, the antenna structure 500 may be disposed at a position at which the plurality of slits 6211 each have a first length L1 from the rear cover 640 in the longitudinal direction thereof. Accordingly, the remaining second length L2 of the each slit 6211 from the antenna structure 500 may be longer than the first length L1. In this case, the plurality of slits 6211 may be disposed in a shape that is open toward the rear cover 640, and may be filled with a dielectric material having a high dielectric constant.

Figure 20:
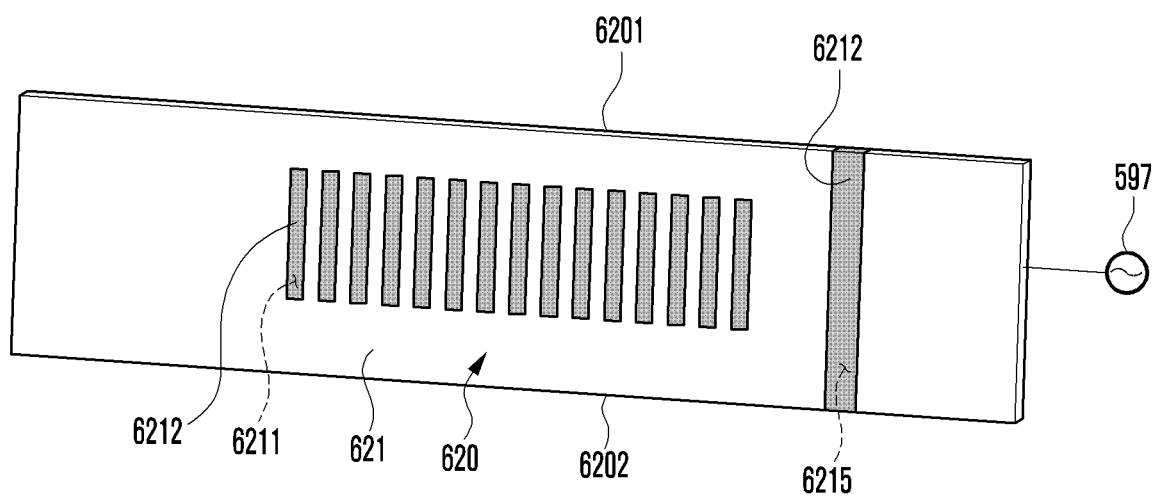
FIG. 20 is a partial perspective view illustrating a conductive portion of a side frame including a split portion, according to various embodiments of the disclosure.

FIG. 20 is a partial perspective view illustrating a conductive portion 621 of a side frame 620 including a split portion 6215, according to various embodiments of the disclosure.

Referring to FIG. 20, the side frame 620 is configured to be at least partially split by an additional split portion 6215 (e.g., a non-conductive portion) disposed on at least a portion of the conductive portion 621, so that the side member 620 may be used as another antenna. For example, the additional split portion 6215 may also be filled with the dielectric material 6212 through injection molding. In this case, the conductive portion 621 split by the additional split portion 6215 may be electrically connected to another wireless communication circuit 597. According to an embodiment, another wireless communication circuit 597 may be utilized as an antenna operating in a band below 6 GHz via the conductive portion 621 split by the additional split portion 6215. For example, the wireless communication circuit 597 may be configured to transmit and/or receive a wireless signal in a 2G, 3G, 4G, 5G (e.g., sub 6 GHz), Wi-Fi, global positioning system (GPS), or Bluetooth service band via the conductive portion split by the additional split portion 6215. In some embodiments, the additional split portion 6215 may be disposed between the plurality of slits 6211 or disposed adjacent to the plurality of slits 6211, thereby operating as any one of the plurality of slits 6211.

Figure 21:
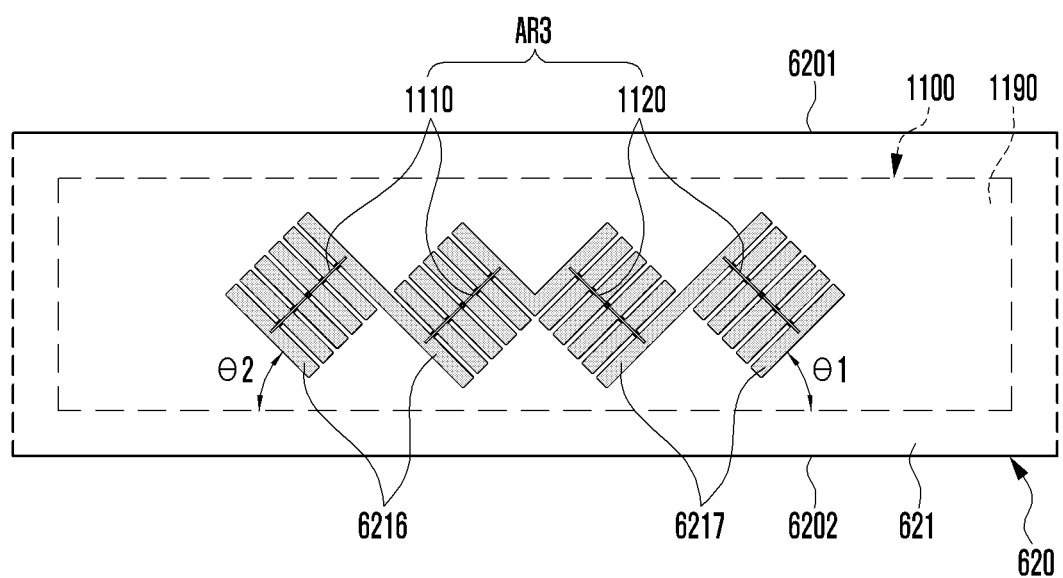
FIGS. 21 and 22 are views each illustrating an arrangement relationship between a plurality of slits in a side frame and an antenna structure, according to various embodiments of the disclosure.
Figure 22:
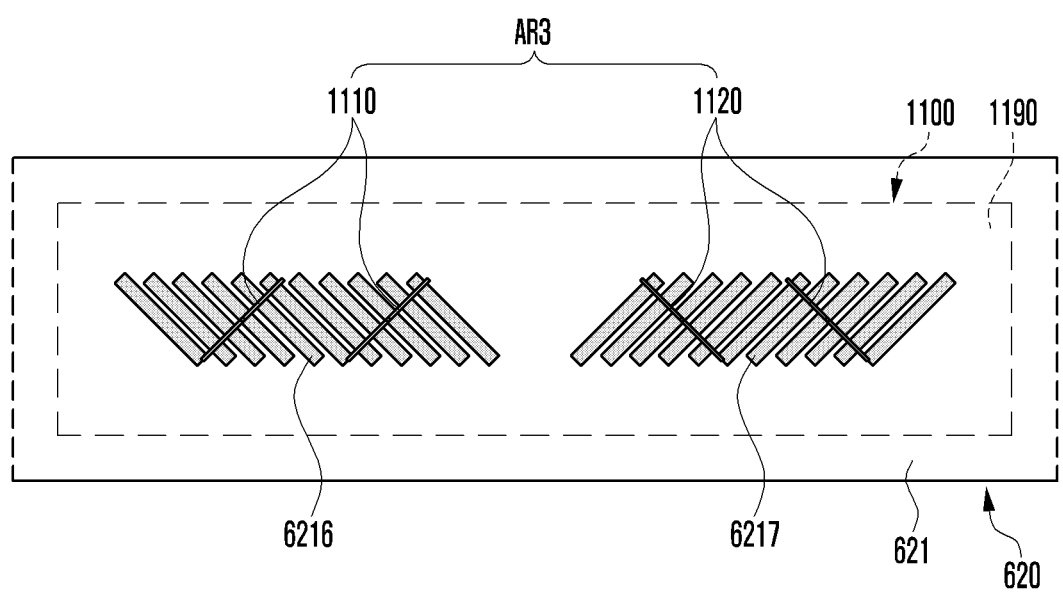

FIGS. 21 and 22 are views each illustrating an arrangement relationship between a plurality of slits 6216 and 6217 in a side frame 620 and an antenna structure 1100, according to various embodiments of the disclosure.

Referring to FIG. 21, the antenna structure 1100 may include a substrate 1190 and an array antenna AR3 including a plurality of antenna elements disposed on the substrate 1190 to be spaced apart from each other. According to an embodiment, the antenna structure may include first antennas 1110 including antenna elements having a first polarization and second antennas 1120 including antenna elements having a second polarization in a direction perpendicular to the first polarization. According to an embodiment, the array antenna AR3 may include a structure for supporting dual polarization multiple-input multiple-output (MIMO).

According to various embodiments, the conductive portion 621 of the side frame 620 disposed at a position corresponding to the antenna structure 1100 may include a plurality of first slits 6216 having a length in a direction perpendicular to the first polarization of the first antennas 1110 and a plurality of second slits 6217 having a length in a direction perpendicular to the second polarization of the second antennas 1120. According to an embodiment, the plurality of slits 6216 and 6217 may be provided in groups to correspond to the antenna elements of each of the antennas 1110 and 1120 in order to maintain aesthetics when viewed from the outside.

According to various embodiments, the first antennas 1110 having the first polarization may be disposed to have a first inclination angle $\theta_1$ with respect to the lower side 6202 of the side frame 620. As another embodiment, the first antennas 1110 may be disposed to have a first inclination angle $\theta_1$ with respect to a long side of the substrate 1190 (e.g., a side parallel to the arrangement direction of an array antenna AR3). For example, in this case, the plurality of second slits 6217 may have the same first inclination angle $\theta_1$ as that of the first antennas 1110 in the conductive portion 621 of the side frame 620.

According to an embodiment, the second antennas 1120 having the second polarization may be disposed to have a second inclination angle $\eta_2$, which is perpendicular to the first inclination angle $\theta_1$, with respect to the upper side 6201 and/or the lower side 6202 of the side frame 620. As another embodiment, the second antennas 1120 may be disposed to have a second inclination angle $\theta_2$ with respect to a long side of the substrate 1190 (e.g., a side parallel to the arrangement direction of an array antenna AR3). For example, in this case, the plurality of first slits may have the same second inclination angle $\theta_2$ as that of the second antennas 1120 in the conductive portion 621 of the side frame 620. In some embodiments, each of the first antennas 1110 and the second antennas 1120 may include two or more antenna elements. In some embodiments, the antenna structure 1100 may include three or more antennas with different polarizations.

Referring to FIG. 22, the side frame 620 may include a plurality of first slits 6216 provided at positions corresponding to the first antennas 1110 including a plurality of antenna elements having a first polarization, and a plurality of second slits 6217 provided at positions corresponding to the second antenna 1120 including a plurality of antenna elements having a second polarization. According to an embodiment, the array antenna AR3 may include a structure for supporting dual polarization MIMO, and may include a structure in which antennas 1110 and 1120 having different polarizations are spaced apart from each other.

According to an embodiment, the plurality of first slits 6216 and the plurality of second slits 6217 may be disposed to be biased to one side rather than being disposed at the center with respect to the corresponding antennas 1110 and 1120, respectively. However, as will be described with reference to FIG. 23 below, since the upper and lower radiating components of the conductive portion 621 are present, the radiation performance may be maintained even if a sufficient opening angle is not provided through the slits 6216 and 6217. For example, maintaining the separation distance between the first antennas 1110 having the first polarization and the second antennas 1120 having the second polarization may be helpful in performance of n×(λ/2). Here, n may be a positive integer representing the number of antennas.

Although not illustrated, the side frame 620 may include a high dielectric coefficient (e.g., the dielectric material 6212 in FIG. 15) filled in a plurality of first slits 6216 and a plurality of second slits 6217 corresponding to the first antennas 1110 and the second antennas 1120 in the conductive portion 621. As another embodiment, the plurality of first slits 6216 and the plurality of second slits 6217 may each include at least one acoustic hole (e.g., the acoustic holes 6213 in FIG. 15) provided through a shape change of the dielectric material.

Figure 23:
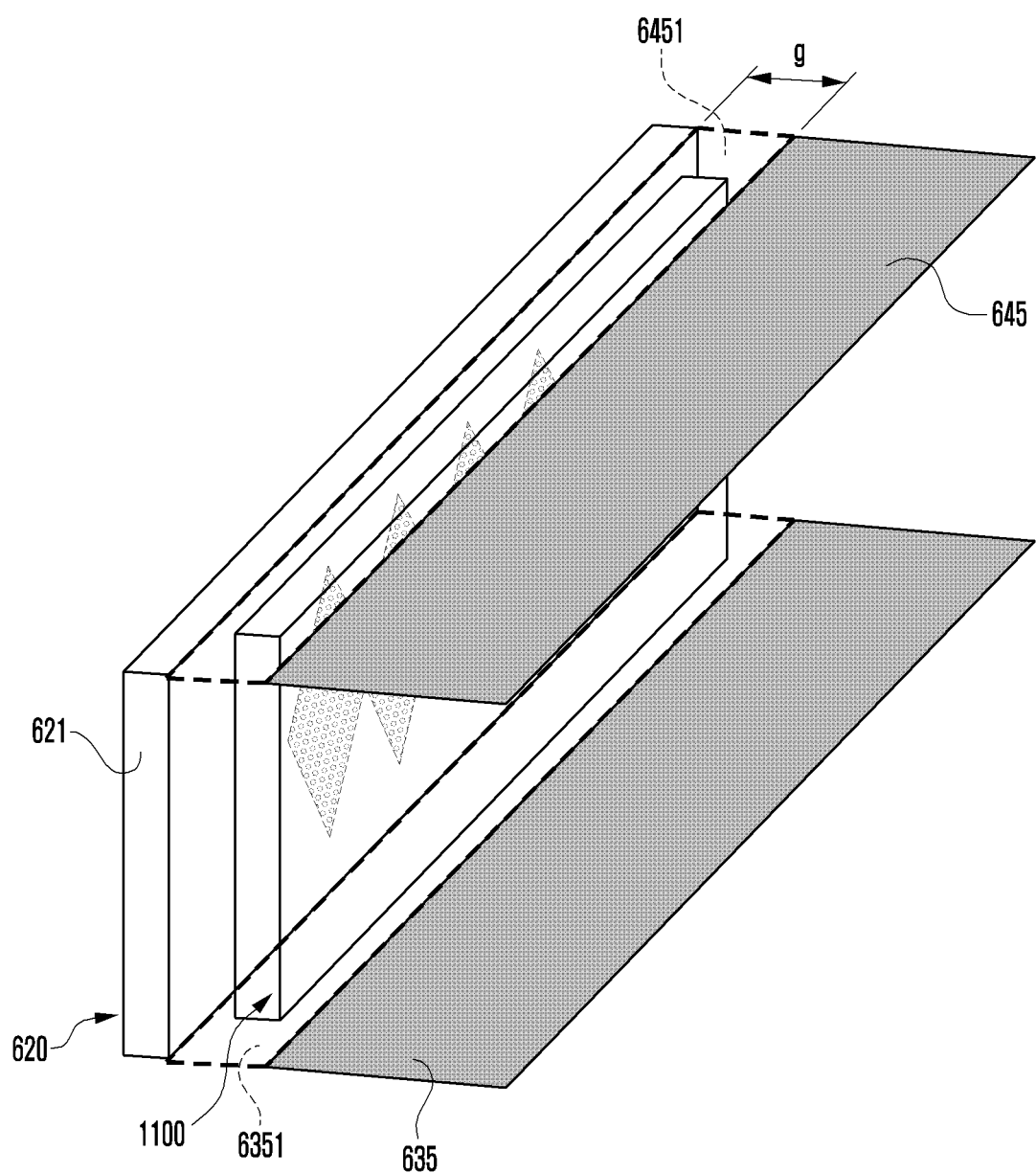
FIG. 23 is a view illustrating a state in which a conductive portion of a side frame is connected to a peripheral conductive structure via non-conductive portions, according to various embodiments of the disclosure.

FIG. 23 is a view illustrating a state in which a conductive portion of a side frame is connected to a peripheral conductive structure via non-conductive portions, according to various embodiments of the disclosure.

According to various embodiments, as illustrated in FIGS. 21 and 22, when antenna elements are disposed diagonally with an inclination angle, the antenna structure (e.g., the antenna structure 1100 in FIG. 21) at least partially radiates via the upper and lower ends of the conductive portion 621 of the side frame 620 as well as through the plurality of slits (e.g., the slits 6216 and 6217 in FIG. 21), and thus the radiation performance may be deteriorated. Accordingly, in order to maintain the radiation performance of the antenna structure (e.g., the antenna structure 1100 in FIG. 21), the upper and lower ends of the conductive portion 621 may be configured as non-conductive portions which are electrically isolated.

Referring to FIG. 23, the electronic device may include at least one conductive structure 635 or 645 disposed around the conductive portion 621 of the side frame 620. According to an embodiment, the at least one conductive structure 635 or 645 may include a conductive member (e.g., a display (e.g., a metal sheet, a metal bracket, or a metal cover)) disposed in the inner space of the electronic device. As described above, for smooth radiation of the antenna structure 1100, the electronic device may include at least one non-conductive structure 6351 or 6451 for separating the at least one conductive structure 635 or 645 from the conductive portion 621 by a predetermined distance. According to an embodiment, the non-conductive structures 6351 and 6451 may include a dielectric material or insulating material. According to an embodiment, the mutual separation distance g between the conductive portion 621 and the at least one conductive structure 635 or 645 via the at least one non-conductive structure 6351 or 6451 may be set to about 2 mm.

Figure 24:
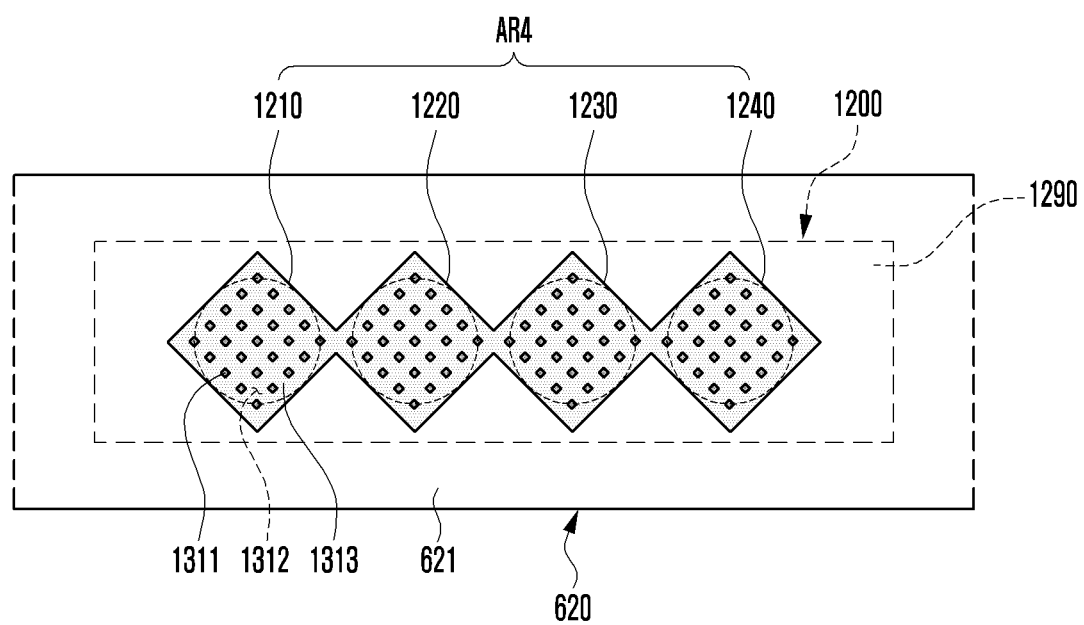
FIGS. 24 and 25 are views each illustrating an arrangement relationship between a plurality of non-conductive portions provided on a conductive portion of a side frame and an antenna structure, according to various embodiments of the disclosure.
Figure 25:
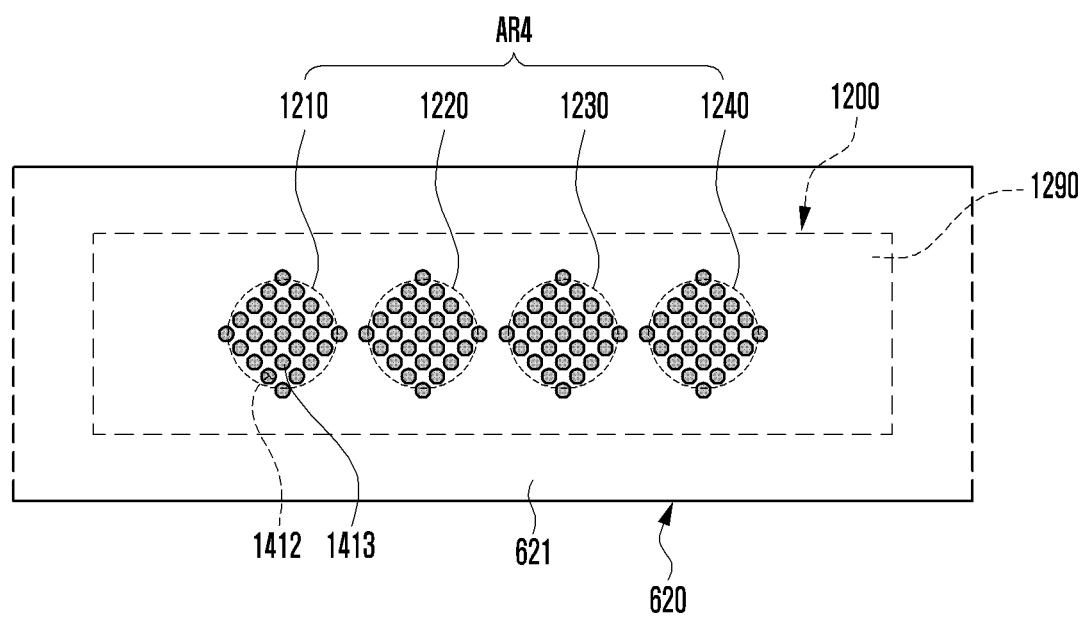

FIGS. 24 and 25 are views each illustrating an arrangement relationship between a plurality of non-conductive portions provided on a conductive portion of a side frame and an antenna structure, according to various embodiments of the disclosure.

FIGS. 24 and 25 illustrate non-conductive areas of various shapes provided in the conductive portion of a side frame corresponding to an antenna structure supporting cross polarization.

Referring to FIG. 24, the antenna structure 1200 may include an array antenna AR4 including a substrate 1290 and a plurality of antenna elements 1210, 1220, 1230, and 1240 disposed on the substrate 1290. According to an embodiment, the plurality of antenna elements 1210, 1220, 1230, and 1240 may each include a conductive patch or a conductive pattern. According to an embodiment, the side frame 620 may include, in the conductive portion 621, a plurality of island-shaped conductive islands 1311 disposed in the areas corresponding to respective antenna elements 1210, 1220, 1230, and 1240 to be spaced apart from each other, and a dielectric material 1313 having a high dielectric constant and connecting the conductive islands 1311 to the conductive portion 621. According to an embodiment, the antenna structure 1200 may form a beam pattern in a predetermined direction via the conductive islands 1311 and the non-conductive area 1312 formed of the dielectric material 1313.

Referring to FIG. 25, the side frame 620 may include, in the conductive portion 621, a plurality of openings 1412 disposed in the areas corresponding to respective antenna elements 1210, 1220, 1230, and 1240 to be spaced apart from each other. According to an embodiment, the plurality of openings 1412 may be filled with a dielectric material 1413 having a high dielectric constant. According to an embodiment, the antenna structure 1200 may form a beam pattern in a predetermined direction via the plurality of openings 1412 filled with the dielectric material 1413. As another embodiment, the plurality of openings 1412 may be configured in an elliptical shape or a polygonal shape, rather than a circular shape. As another embodiment, the plurality of openings 1412 may be provided to have different shapes and/or arrangement densities.

According to various embodiments, an electronic device (e.g., the electronic device 600 in FIG. 6) may include a front cover (e.g., the front cover 630 in FIG. 6), a rear cover facing away from the front cover (e.g., the rear cover 640 in FIG. 6), a side frame (e.g., the side frame 620 in FIG. 6) surrounding a space (e.g., the space 6001 in FIG. 6) between the front cover and the rear cover and at least partially including a first conductive portion (e.g., the conductive portion 621 in FIG. 6), a first array antenna (e.g., the array antenna AR1 in FIG. 5) disposed in the space and including a first substrate (e.g., the first substrate 590 in FIG. 1) and a plurality of first antenna elements (e.g., the plurality of antenna elements 510 and 520 in FIG. 5) disposed on the first substrate and configured to form a beam pattern toward the first conductive portion, and a wireless communication circuit (e.g., the wireless communication circuit 595 in FIG. 5) configured to transmit and/or receive a radio signal in a first frequency range via the first array antenna in the space, wherein the first conductive portion may include, in a portion corresponding to the first array antenna, a plurality of first slits (e.g., the plurality of slits 6211 in FIG. 5) provided to be spaced apart from each other and have a length in a direction perpendicular to the polarization of the array antenna.

According to various embodiments, the plurality of first antenna elements may be configured to have equal and form a beam.

According to various embodiments, the first frequency range may include a frequency range of 20 GHz to 100 GHz.

According to various embodiments, each of the plurality of first slits may have a length of 2.5 to 4 mm.

According to various embodiments, each of the plurality of first slits may have a width of 0.6 to 0.8 mm.

According to various embodiments, a second conductive portion disposed on either the front cover or the rear cover near the first conductive portion may be further included.

According to various embodiments, the first conductive portion and the second conductive portion may be connected to each other via a non-conductive portion.

According to various embodiments, a second conductive portion disposed on at least a portion of the rear cover in the space may be included.

According to various embodiments, a second array antenna including a second substrate disposed on a portion corresponding to the second conductive portion in the space and a plurality of second antenna elements disposed on the second substrate may be further included, wherein the second conductive portion may include, in a portion corresponding to the second array antenna, a plurality of second slits provided to be spaced apart from each other and have a length in a direction perpendicular to a polarization of the second array antenna.

According to various embodiments, the first array antenna and the second array antenna may be disposed to form beam patterns to be perpendicular to each other.

According to various embodiments, the first substrate may be electrically connected to the second substrate via an electrical connection member.

According to various embodiments, the second substrate may include the wireless communication circuit.

According to various embodiments, the wireless communication circuit may be configured to transmit and/or receive a wireless signal in the first frequency range via the first array antenna and/or the second array antenna.

According to various embodiments, an acoustic module disposed in the inner space may be further included, wherein the plurality of first slits may be used as sound transmission passages of the acoustic module.

According to various embodiments, the plurality of first slits may be at least partially filled with a dielectric material.

According to various embodiments, the dielectric material may have a dielectric constant in a range of 4 to 10.

According to various embodiments, an acoustic module disposed in the space may be further included, wherein at least a portion of the dielectric material may include an acoustic hole, and the acoustic hole may be used as a sound transmission passage of the acoustic module.

According to various embodiments, the acoustic module may include a speaker device or a microphone device.

According to various embodiments, at least some of the plurality of first antenna elements may be disposed to have a first inclination angle, and the remaining antenna elements may be disposed to have a second inclination angle perpendicular to the first inclination angle.

According to various embodiments, a plurality of slits corresponding to the antenna elements having the first inclination angle among the plurality of first slits are disposed to have a length in a direction having the second inclination angle, and a plurality of slits corresponding to the remaining antenna elements having the second inclination angle among the plurality of first slits may be disposed to have a length in a direction having the first inclination angle.

According to various embodiments, a display disposed in the space to be visible from the outside through at least a portion of the front cover may be further included.

Various embodiments disclosed in this specification and drawings merely present specific examples in order to easily describe the technical contents according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

What is claimed is:
1. An electronic device, comprising:
a front cover;
a rear cover facing away from the front cover;
a side frame surrounding a space between the front cover and the rear cover and at least partially including a first conductive portion;
a first array antenna including a first substrate disposed in the space and a plurality of first antenna elements disposed on the first substrate, the plurality of first antenna elements being configured to form a beam pattern toward the first conductive portion;
a wireless communication circuit configured to transmit or receive a wireless signal in a first frequency range via the first array antenna; and
an acoustic sound device disposed in the space,
wherein the first conductive portion includes, in a portion corresponding to the first array antenna, a plurality of first slits provided to be spaced apart from each other and to have a length in a first direction perpendicular to a polarization of the first array antenna,
wherein the plurality of first slits are at least partially filled with a dielectric material, and
wherein at least a portion of the dielectric material includes an acoustic hole, the acoustic hole being used as a sound transmission passage of the acoustic sound device.

2. The electronic device of claim 1, wherein the plurality of first antenna elements are configured to have equal or unequal phases and to form a beam.

3. The electronic device of claim 1, wherein the first frequency range includes a frequency range of 20 GHz to 100 GHz.

4. The electronic device of claim 1, wherein each of the plurality of first slits has a length of 2.5 to 4 mm.

5. The electronic device of claim 1, wherein each of the plurality of first slits has a width of 0.6 to 0.8 mm.

6. The electronic device of claim 1, further comprising a second conductive portion disposed on at least one of the front cover and the rear cover near the first conductive portion.

7. The electronic device of claim 6, wherein the first conductive portion and the second conductive portion are connected via a non-conductive portion.

8. The electronic device of claim 7, further comprising:
a second array antenna including a second substrate disposed on a portion corresponding to the second conductive portion in the space and a plurality of second antenna elements disposed on the second substrate,
wherein the second conductive portion includes, in a portion corresponding to the second array antenna, a plurality of second slits provided to be spaced apart from each other and have a length in a second direction perpendicular to a polarization of the second array antenna.

9. The electronic device of claim 8, wherein
the first array antenna is disposed to form first beam patterns,
the second array antenna is disposed to form second beam patterns, and
the first beam patterns are perpendicular to the second beam patterns.

10. The electronic device of claim 9, wherein the first substrate is electrically connected to the second substrate via an electrical connection member.

11. The electronic device of claim 10, wherein the second substrate includes the wireless communication circuit.

12. The electronic device of claim 11, wherein the wireless communication circuit is configured to transmit or receive the wireless signal in the first frequency range via at least one of the first array antenna and the second array antenna.

13. The electronic device of claim 1, wherein the dielectric material has a dielectric constant in a range of 4 to 10.

14. The electronic device of claim 1, wherein at least some of the plurality of first antenna elements is disposed to have a first inclination angle, and
the remaining antenna elements are disposed to have a second inclination angle perpendicular to the first inclination angle.

15. The electronic device of claim 14, wherein a plurality of slits corresponding to the antenna elements having the first inclination angle among the plurality of first slits are disposed to have a length in a direction having the second inclination angle, and
a plurality of slits corresponding to the remaining antenna elements having the second inclination angle among the plurality of first slits are disposed to have a length in a direction having the first inclination angle.

16. The electronic device of claim 1, further comprising a display disposed in the space to be visible from the outside through at least a portion of the front cover.

17. An electronic device, comprising:
a front cover;
a rear cover facing a direction opposite to the front cover;
a side frame surrounding a space between the front cover and the rear cover and at least partially including a first conductive portion;
a second conductive portion disposed on at least one of the front cover and the rear cover near the first conductive portion;
a first array antenna including a first substrate disposed in the space and a plurality of first antenna elements disposed on the first substrate, the plurality of first antenna elements being configured to form a beam pattern toward the first conductive portion;
a second array antenna including a second substrate disposed on a portion corresponding to the second conductive portion in the space and a plurality of second antenna elements disposed on the second substrate;
a wireless communication circuit configured to perform, via the first array antenna or the second array antenna, at least one of a transmission and a reception of a wireless signal in a first frequency range; and
an acoustic sound device disposed in the space,
wherein the first conductive portion includes, in a portion corresponding to the first array antenna, a plurality of first slits provided to be spaced apart from each other and to have a length in a first direction perpendicular to a polarization of the first array antenna,
wherein the second conductive portion includes, in a portion corresponding to the second array antenna, a plurality of second slits provided to be spaced apart from each other and have a length in a second direction perpendicular to a polarization of the second array antenna,
wherein the plurality of first slits are at least partially filled with a dielectric material, and
wherein at least a portion of the dielectric material includes an acoustic hole, the acoustic hole being used as a sound transmission passage of the acoustic sound device.

* * * * *